US010861352B2

(12) United States Patent
Perkins et al.

(10) Patent No.: US 10,861,352 B2
(45) Date of Patent: Dec. 8, 2020

(54) OPHTHALMOLOGICAL TEACHING AID

(71) Applicant: Welch Allyn, Inc., Skaneateles Falls, NY (US)

(72) Inventors: David G. Perkins, Tully, NY (US); Christopher Daly, Skaneateles Falls, NY (US); Erin Mickam, Skaneateles Falls, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 348 days.

(21) Appl. No.: 15/993,673

(22) Filed: May 31, 2018

(65) Prior Publication Data
US 2019/0311652 A1 Oct. 10, 2019

Related U.S. Application Data

(60) Provisional application No. 62/659,876, filed on Apr. 19, 2018, provisional application No. 62/653,048, filed on Apr. 5, 2018.

(51) Int. Cl.
G09B 23/22 (2006.01)
G09B 23/28 (2006.01)

(52) U.S. Cl.
CPC .............. *G09B 23/28* (2013.01); *G09B 23/22* (2013.01)

(58) Field of Classification Search
CPC ................................ G09B 23/28; G09B 23/22
USPC ........................................................ 434/271
See application file for complete search history.

(56) References Cited

U.S. PATENT DOCUMENTS

| 3,438,698 A * | 4/1969 | Triggs .................... G02B 27/04 359/803 |
| 4,148,565 A * | 4/1979 | Gunst ...................... A61H 5/00 351/203 |
| 4,506,963 A * | 3/1985 | Cooper .................... A61H 5/00 351/201 |
| 4,756,305 A * | 7/1988 | Mateik ..................... A61B 3/08 601/37 |
| 4,762,495 A | 8/1988 | Maloney et al. |

(Continued)

FOREIGN PATENT DOCUMENTS

JP 2003195741 A 7/2003

OTHER PUBLICATIONS

Derwent Innovation Record View; Patent Record Full View; Saturday, Mar. 31, 2018; Derwent Innovation; Patent/Publicaiton: JP2003195741A; Key Summary Data; Publication Date: Jul. 9, 2003; DWPI Family: Live: Expiration Date: 2021-21-27 (estimated); Original Assignee: Mori Kanae; 7-pages.

(Continued)

*Primary Examiner* — Michael C Grant
(74) *Attorney, Agent, or Firm* — Barclay Damon LLP

(57) ABSTRACT

An ophthalmological teaching aid includes a shell having an outer surface, an interior, a student region with a viewing window, and an observation target in the interior of the shell. The observation target is positioned to be visible to a viewer looking through the viewing window and has at least one feature residing at a feature location. The teaching aid also includes an instructor region spatially corresponding to at least a portion of the observation target. The teaching aid includes a landmark corresponding to the feature location. The presence of the landmark enables the instructor to assess a student's skill in using an ophthalmoscope.

20 Claims, 26 Drawing Sheets

(56) References Cited

U.S. PATENT DOCUMENTS

| | | | |
|---|---|---|---|
| 4,762,496 A | 8/1988 | Maloney et al. | |
| 4,865,551 A | 9/1989 | Maloney et al. | |
| 4,865,552 A | 9/1989 | Maloney et al. | |
| 5,149,270 A * | 9/1992 | McKeown | G09B 23/285 |
| | | | 434/262 |
| 5,221,208 A * | 6/1993 | Alexander | G09B 23/30 |
| | | | 434/271 |
| 5,403,191 A * | 4/1995 | Tuason | G09B 23/285 |
| | | | 434/262 |
| 5,572,371 A * | 11/1996 | Woolf | G02B 27/04 |
| | | | 359/801 |
| 5,893,719 A * | 4/1999 | Radow | G09B 23/28 |
| | | | 434/271 |
| 8,157,568 B2 | 4/2012 | Nara | |
| 8,814,356 B2 | 8/2014 | Ehrmann et al. | |
| 2004/0191740 A1* | 9/2004 | Johnson, Jr. | G09B 23/30 |
| | | | 434/271 |
| 2009/0004636 A1 | 1/2009 | Carda et al. | |
| 2009/0291423 A1* | 11/2009 | Hara | G09B 23/34 |
| | | | 434/271 |
| 2012/0015335 A1* | 1/2012 | Smith | G09B 23/28 |
| | | | 434/262 |
| 2014/0051049 A1* | 2/2014 | Jarc | G09B 23/285 |
| | | | 434/267 |
| 2014/0134587 A1* | 5/2014 | Forte | G09B 23/30 |
| | | | 434/267 |
| 2015/0279238 A1* | 10/2015 | Forte | G09B 7/02 |
| | | | 434/271 |
| 2016/0140876 A1* | 5/2016 | Jabbour | G09B 23/285 |
| | | | 434/262 |
| 2017/0316720 A1* | 11/2017 | Singh | G09B 23/285 |
| 2019/0051216 A1* | 2/2019 | Bernal | G16H 50/50 |

OTHER PUBLICATIONS

Human Eye Phantom for Developing Computer and Robot-Assisted Epiretinal Membrane Peeling*; Amrita Gupta, Student Member, IEEE, Berk Gonenc, Student Member, Marcin Balicki, Student Member, IEEE, Kevin Olds, Student Member, IEEE, James Handa, Peter Gehlbach, Member, IEEE, Russell H.Tayolr, Fellow, IEEE, and Iulian Iordachita, Senior Member, IEEE; 978-1-4244-7929-0/14/$26.00 (c)2014 IEEE.

Addressing the 'forgotten art of fundoscopy': evaluation of a novel teaching ophthalmoscope; Eue (2016) 30, 375-384 (c) 2016 Macmillan Publishers Limited All rights reserved 0950-222X/16/; Schultz; Moore, Hassan, Tamsett, and Smith; 10-pages.

* cited by examiner

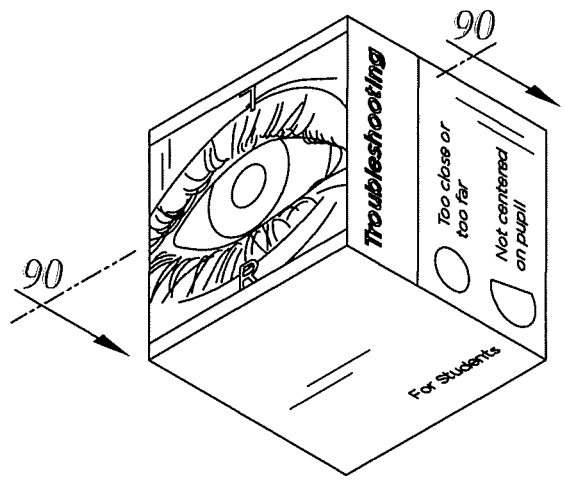
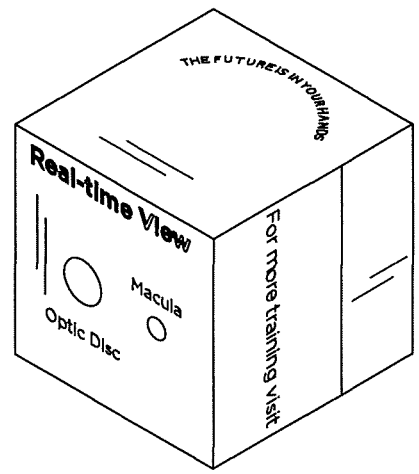
FIG. 82　　　　　　　　FIG. 83
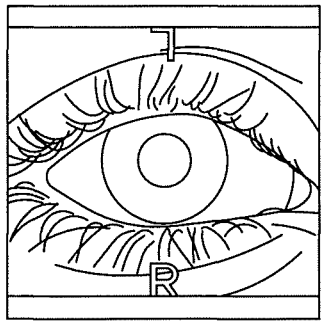
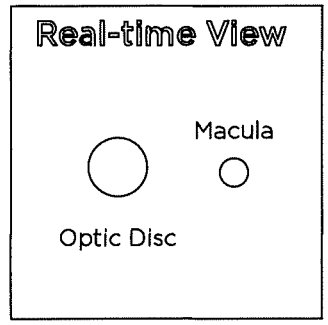
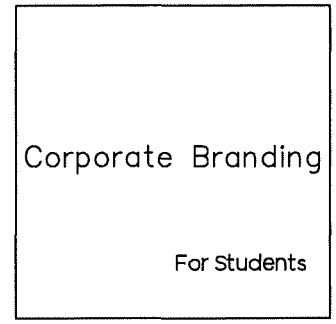
FIG. 84　　　　FIG. 85　　　　FIG. 86
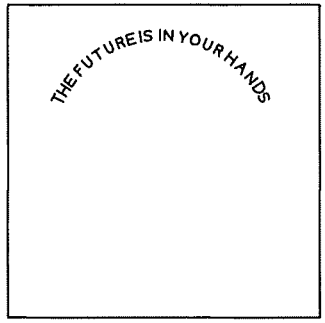
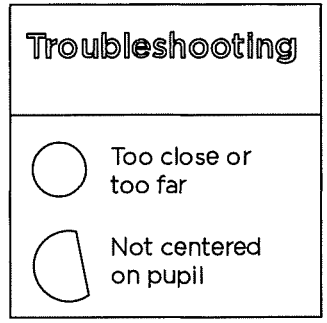
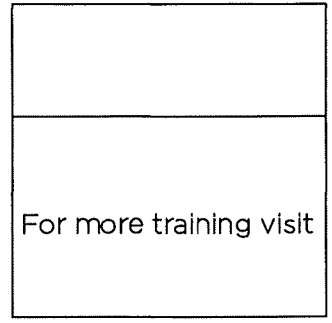
FIG. 87　　　　FIG. 88　　　　FIG. 89
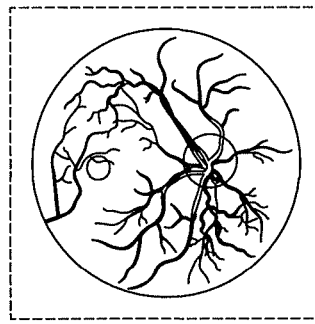
FIG. 90

OPHTHALMOLOGICAL TEACHING AID

This application claims priority to U.S. provisional applications 62/653,048 filed on Apr. 5, 2018 and 62/659,876 filed on Apr. 19, 2018 the contents of both of which are incorporated herein by reference.

TECHNICAL FIELD

The subject matter described herein relates to an ophthalmological teaching aid, and particularly to an aid for teaching the use of an ophthalmoscope which affords the instructor a way to discern what the student sees, thereby improving the quality of teaching.

BACKGROUND

Conventional ophthalmoscopes can be used to quickly and effectively detect a number of serious diseases. Ophthalmoscopy, also referred to as fundoscopy, is therefore a fundamental skill for many health care professionals. Unfortunately it can be difficult for an instructor to teach proper techniques for using an ophthalmoscope and for a student to learn those techniques. The difficulty arises in part from the fact that the instructor cannot see what the student sees when the student practices his ophthalmoscopy skills, either on a living subject or an inanimate model. A student may believe he is viewing what the instructor expects, but both student and instructor are typically unsure. As a result, the quality of the instruction is suboptimal.

SUMMARY

An ophthalmological teaching aid includes a shell having an outer surface, an interior, a student region with a viewing window, and an observation target in the interior of the shell. The observation target is positioned to be visible to a viewer looking through the viewing window and has at least one feature residing at a feature location. The teaching aid also includes an instructor region spatially corresponding to at least a portion of the observation target. The teaching aid includes a landmark corresponding to the feature location.

BRIEF DESCRIPTION OF THE DRAWINGS

The foregoing and other features of the various embodiments of the ophthalmological teaching aid described herein will become more apparent from the following detailed description and the accompanying drawings in which.

DETAILED DESCRIPTION

Figure 1:
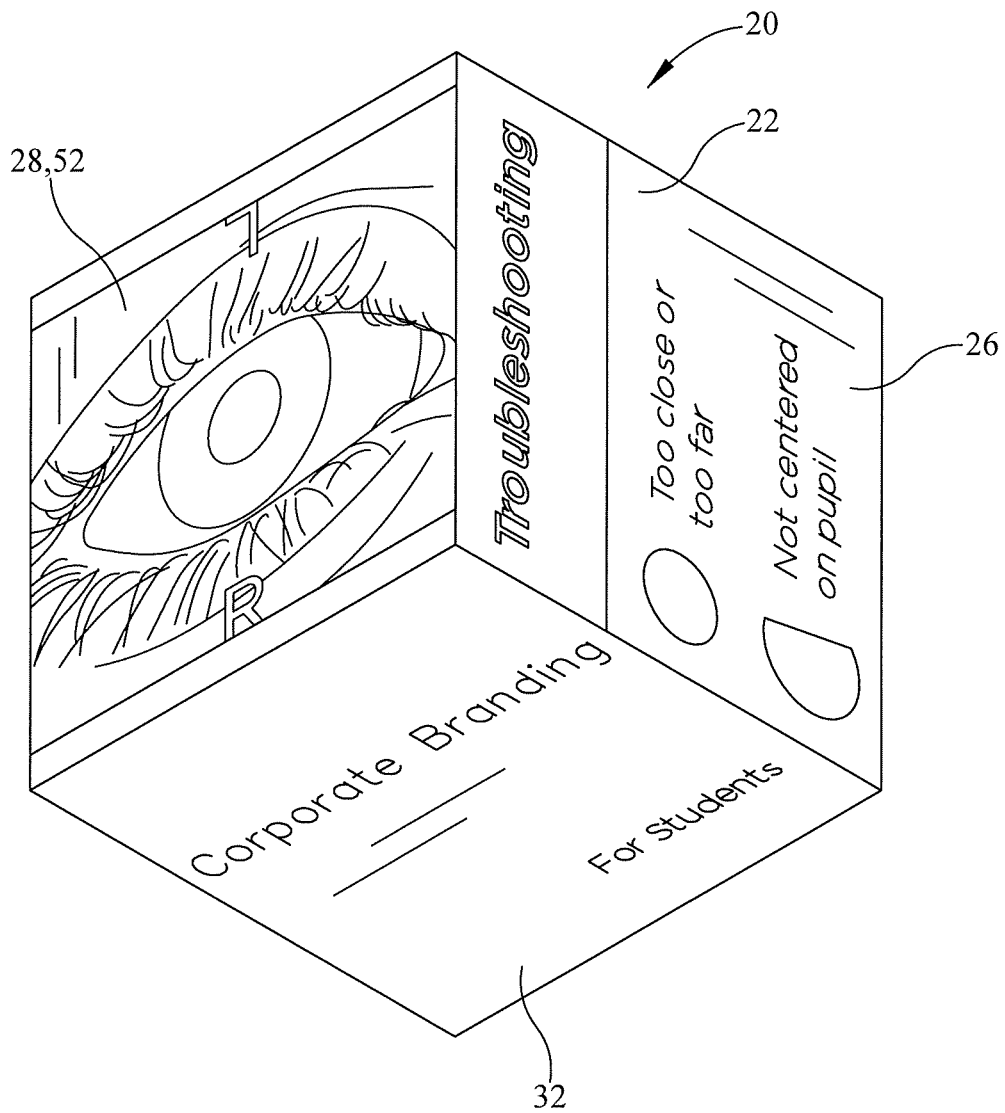
FIG. 1 is a view showing the bottom side, front side and a first lateral side of a shell component of an ophthalmological teaching aid as described herein.

In this specification and drawings, features similar to or the same as features already described may be identified by reference characters or numerals which are the same as or similar to those previously used. Similar elements or variants thereof may be identified by a common reference character or numeral, with suffixes being used to refer to specific occurrences of the element or variants.

Figure 2:
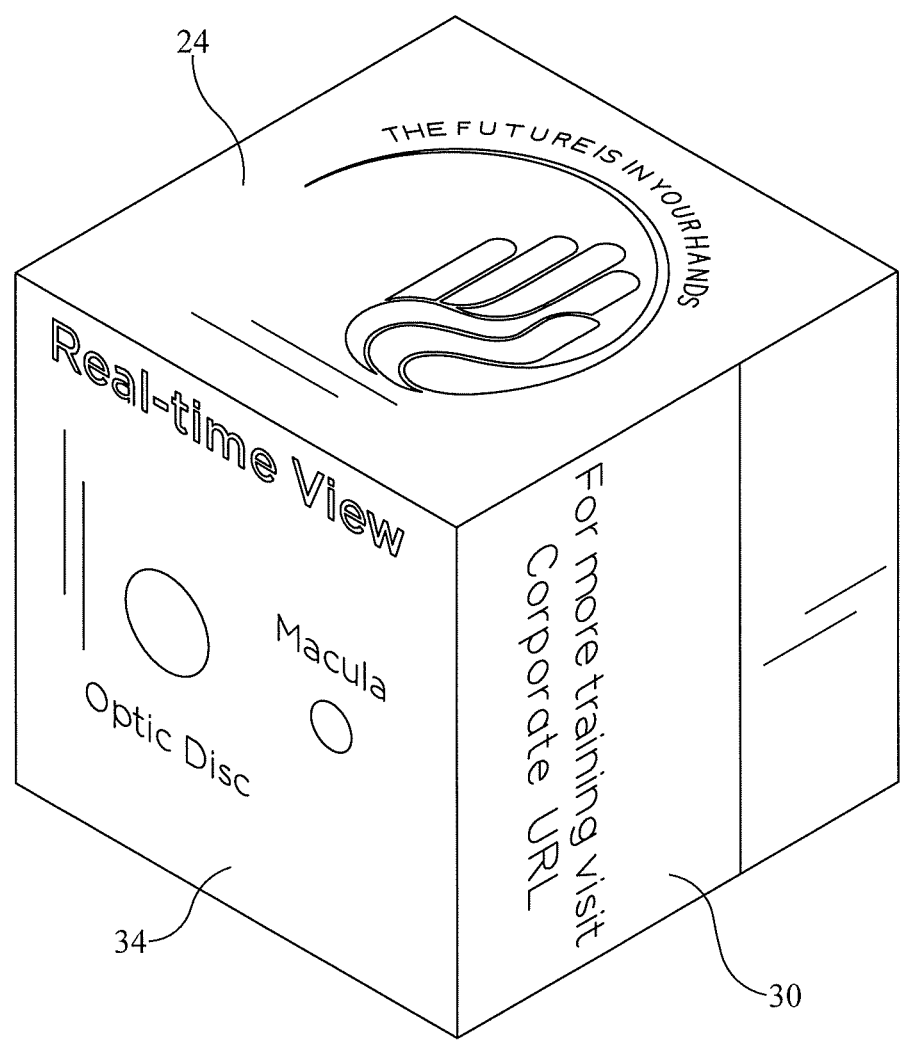
FIG. 2 is a view similar to FIG. 1 showing the top side, rear side and a second lateral side of the shell.
Figure 3A:
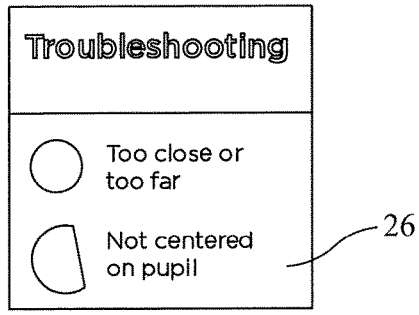
FIGS. 3A-3F are views of the top panel or side, first lateral panel or side, front panel or side, second lateral panel or side, bottom panel or side, and back panel or side respectively of the shell.
Figure 3B:
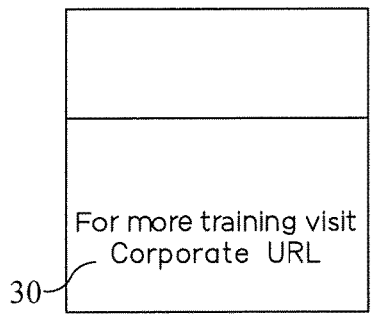
Figure 3C:
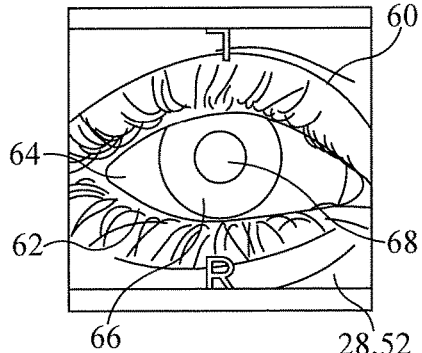
Figure 3D:
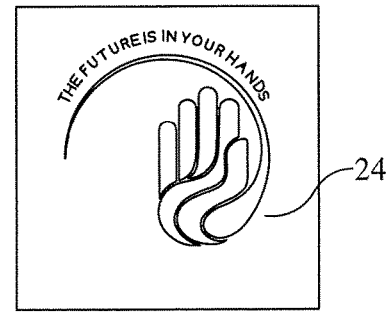
Figure 3E:
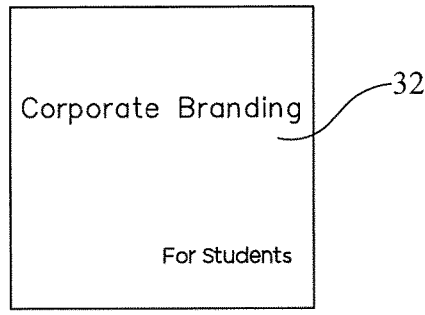
Figure 3F:
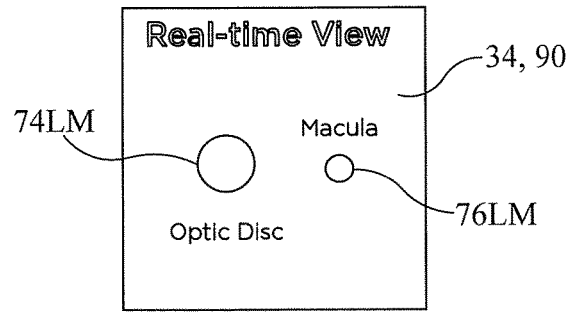
Figure 4:
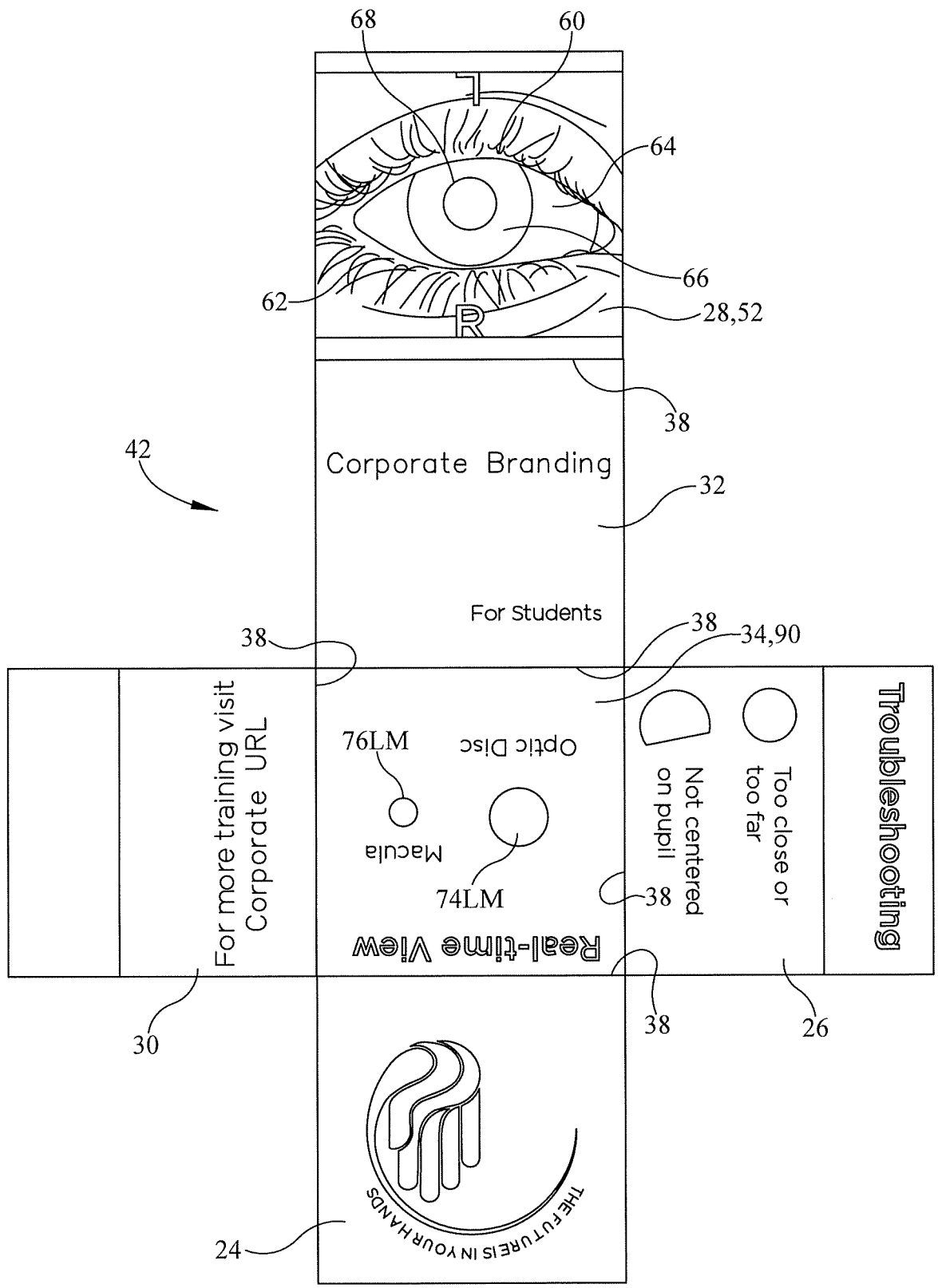
FIG. 4 is a view of the shell in an unfolded state showing its outer surface.
Figure 5:
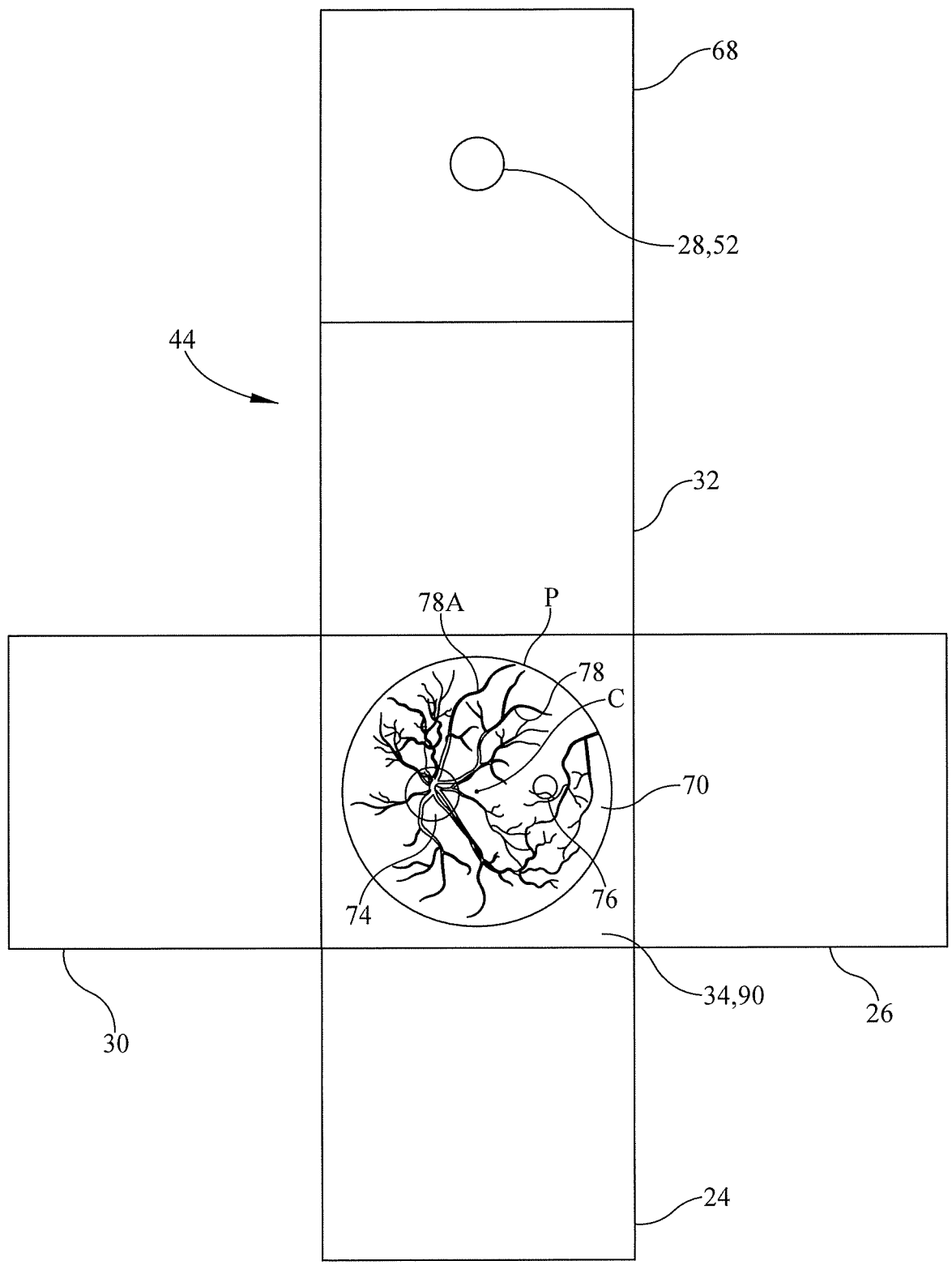
FIG. 5 is a view of the shell in an unfolded state showing its inner surface.
Figure 6:
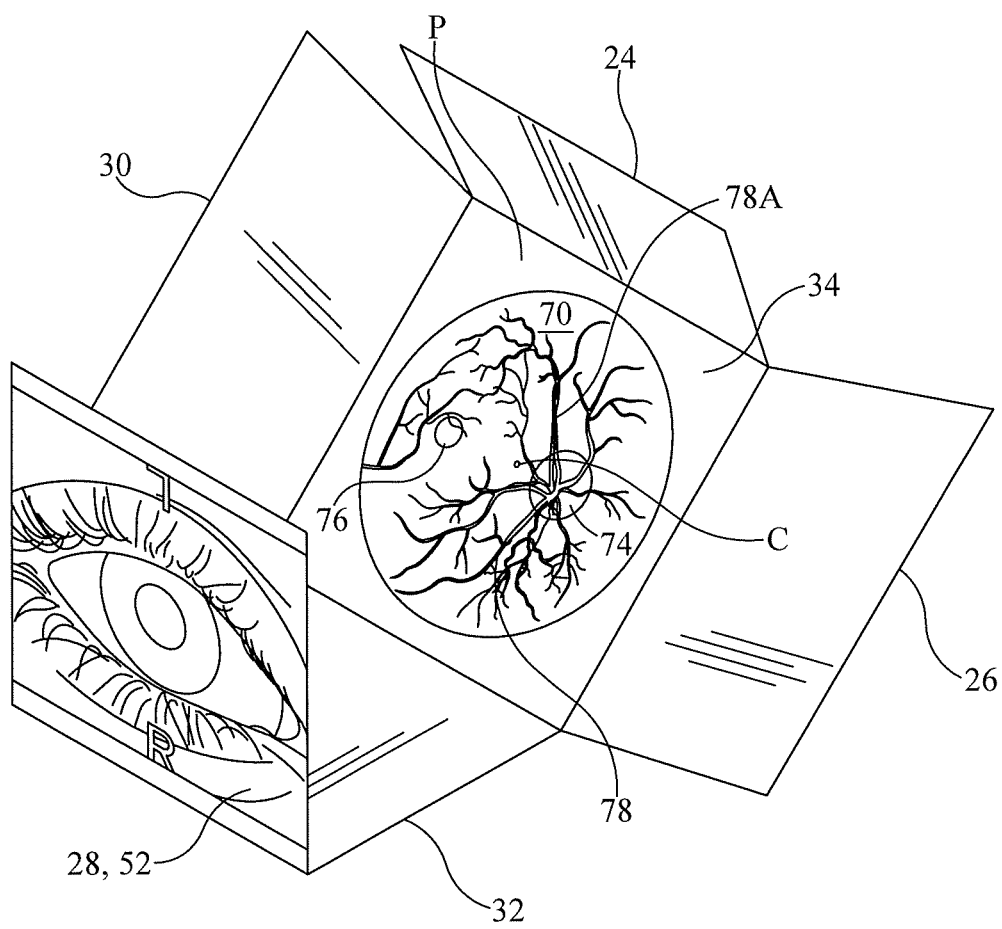
FIG. 6 is a partially unfolded view of the shell.

FIGS. 1-2 show an ophthalmological teaching aid 20 having a shell 22 made of a material similar to conventional cardstock. FIGS. 1 and 2 show the shell in its finished state, which is a parallelepiped, specifically a cube. Referring additionally to FIGS. 3A-3F, the shell includes six sides or panels, a top side or panel 24, a first lateral side or panel 26, a front side or panel 28, a second lateral side or panel 30, a bottom side or panel 32, and a back side or panel 34. FIGS. 4 and 5 show the shell in an unfinished or precursor state, which is flat. FIG. 6 shows the shell in a partially unfolded (or partially folded) state. During manufacture the flat precursor of FIGS. 4-5 is folded at fold lines 38 (FIG. 4) to yield the cubic finished form of FIGS. 1-2.

Figure 14:
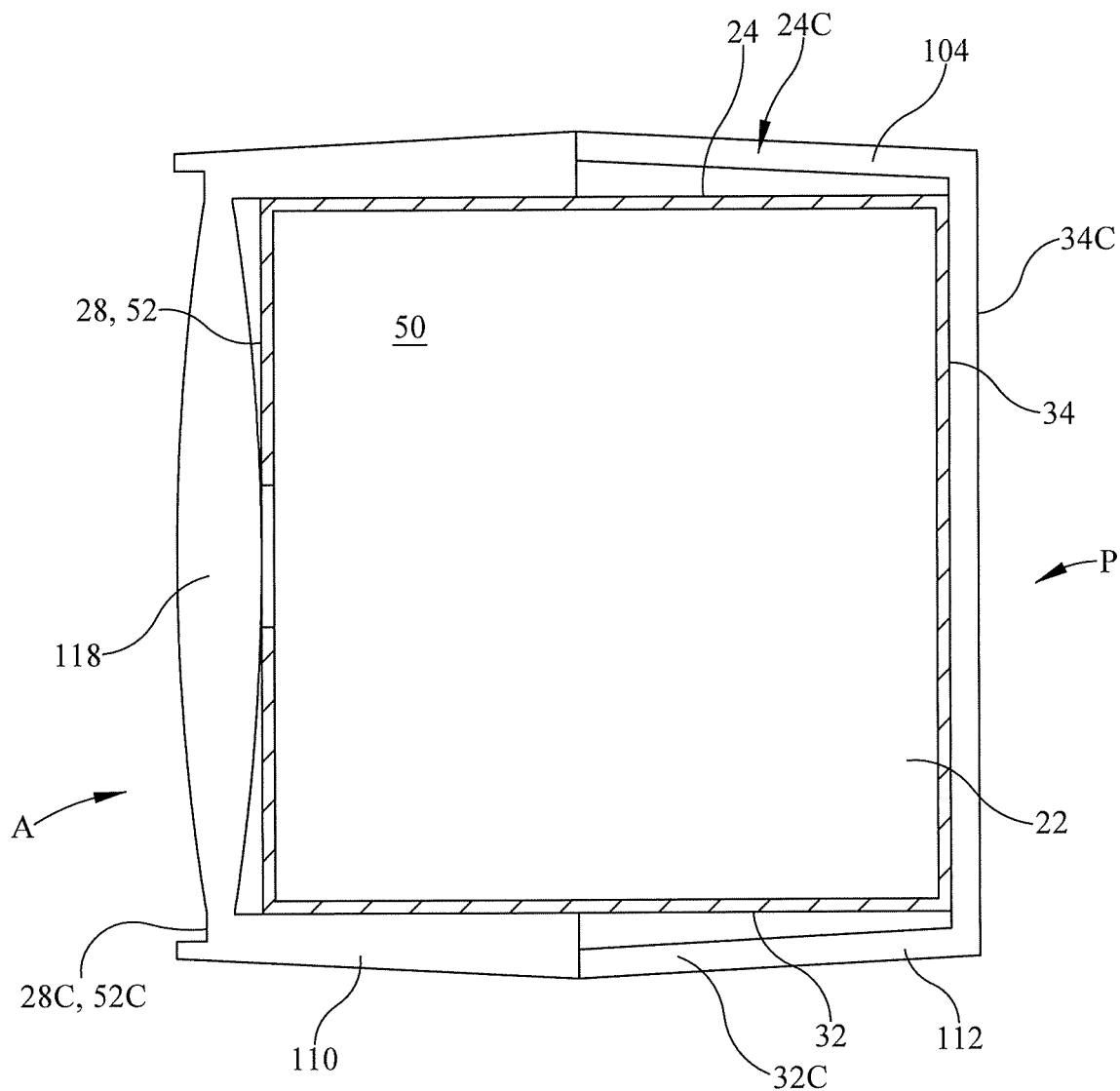
FIG. 14 is a view in the direction 14-14 of FIG. 13 showing the interior of the shell.
Figure 15:
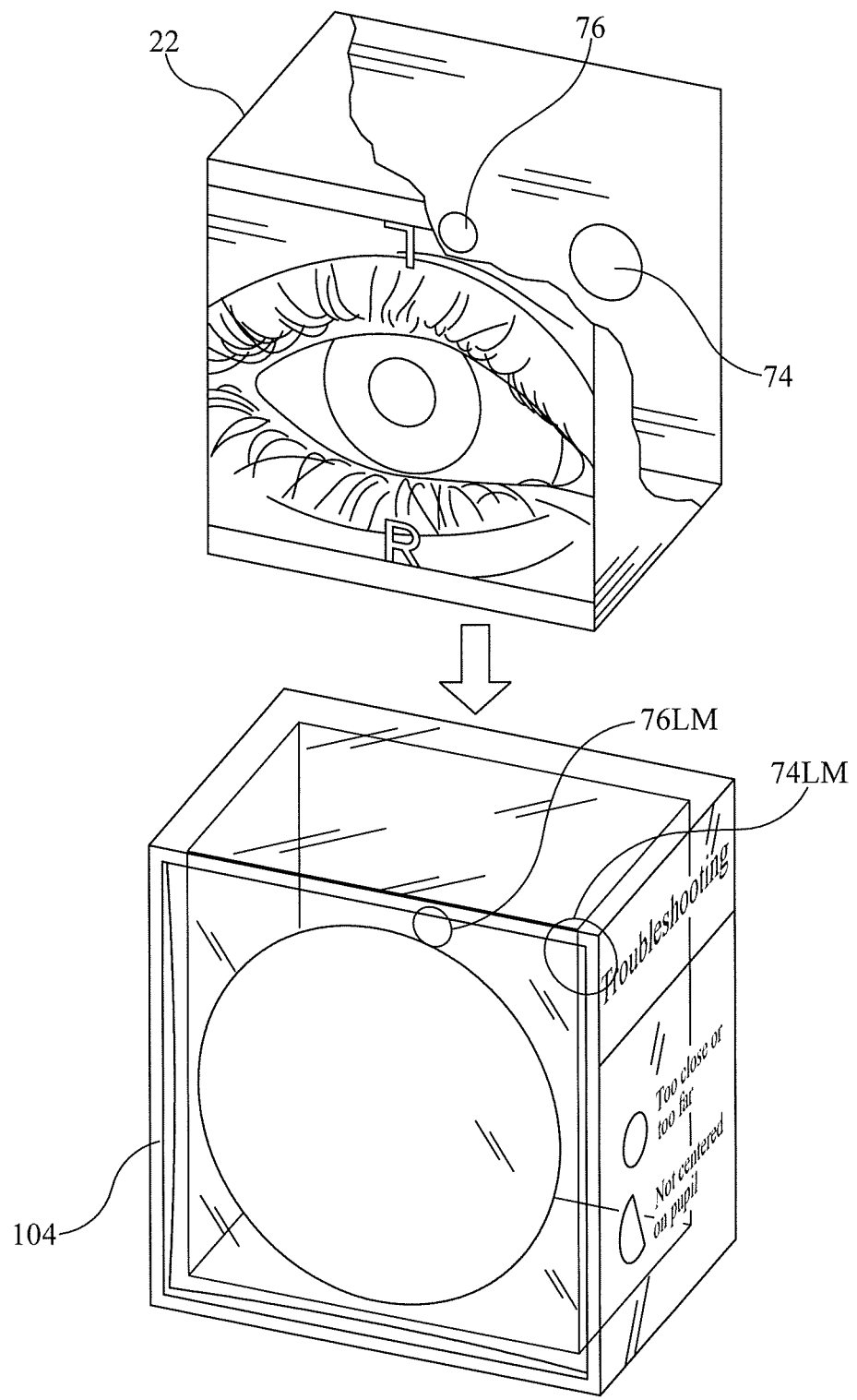
FIG. 15 is an exploded view of an embodiment of the teaching aid having text and landmarks depicted on the surface of the capsule.
Figure 16:
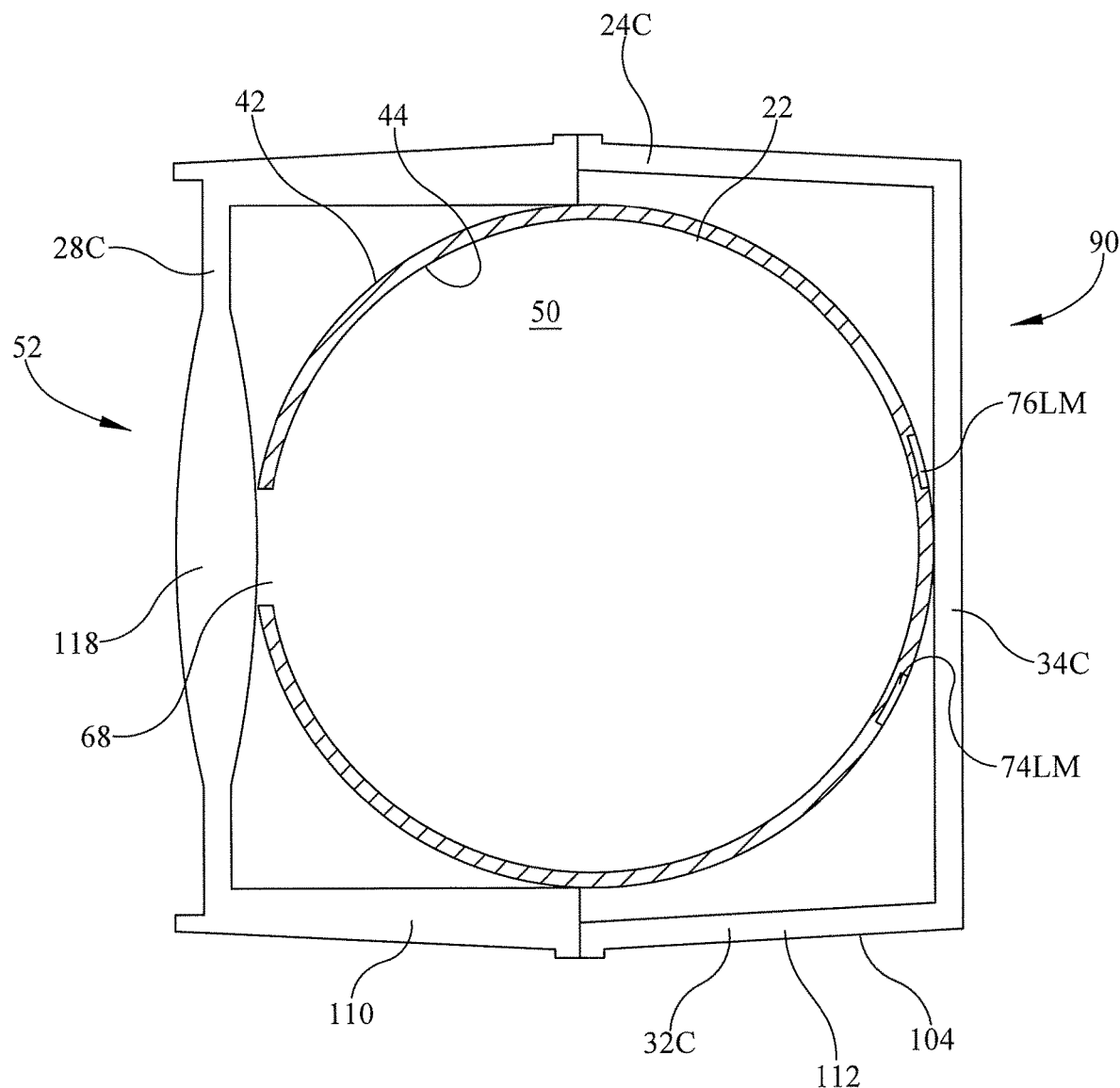
FIG. 16 is a view similar to FIG. 14 showing an embodiment of the teaching aid in which the shell is spherical.

The shell has an outer surface 42 defined by the panel surfaces seen in FIG. 4, and an inner surface 44 defined by the panel surfaces seen in FIG. 5. In the folded state the six sides bound a shell interior 50 which is indicated in FIGS. 14-16.

The shell includes a student region 52 which, in the embodiment of FIGS. 1-6, is front panel or front side 28. The student region includes a depiction of anterior parts of the eye which are customarily visible by an observer. These parts include upper and lower lashes 60, 62, sclera 64, and an iris 66 circumscribing a pupil 68. The illustrated pupil is an opening or aperture that penetrates through the material from which the teaching aid is constructed. The pupil serves as a viewing window for the student who practices his techniques by aiming an ophthalmoscope at the pupil and looking through the ophthalmoscope into the interior of the shell. The student region also includes an indication, such as the letter "R" in an upright orientation, just below the lower eyelash, to signify that the teaching aide is a simulation of the right eye.

The interior 50 of the shell presents an observation target 70 to the student. The observation target is positioned to be visible to a viewer looking through the window, i.e. to a student looking through simulated pupil 68 with an ophthalmoscope. In the illustrated embodiment the observation target is printed on the shell inner surface 44, specifically on the inner surface of back panel 34

The observation target is a rendering of one or more anatomical features of an ocular fundus. The features shown in FIGS. 5 and 6 include the optic disc 74, macula 76, and circulatory elements 78 such as retinal arteries and vanes. Each feature resides at a prescribed feature location. For example optic disc 74 is positioned off-center to the nasal side of the eye, macula 76 is positioned off-center to the temporal side of the eye, and circulatory element 78A is positioned so that it traverses a path from the optic disc to a point P on the edge of the target region.

The reader acquainted with anatomy will realize that not all of the anatomical features of FIGS. 5-6 are anatomically correctly positioned. In particular, the position of feature 76, representing the macula, is displaced from its anatomically correct position, which is approximately at the center C of the observation target. If the depiction of the macula were positioned with anatomic fidelity the student could find and observe it with little difficulty. By positioning it so that the student can find it only by sighting obliquely through the pupil, the student is presented with a greater challenge and therefore more meaningful practice at locating features of interest.

The shell also includes an instructor region 90 on the side of the cube opposite the student region. In the illustrated embodiment the instructor region is the back panel or back side 34 of the cube. The instructor region corresponds spatially to at least a portion of the observation target, and may be entirely coextensive with the observation target. The outer surface of the instructor region of the shell includes a landmark corresponding to the location of a sister anatomical feature. The illustrated embodiment includes two landmarks, 74LM corresponding to sister optic disc feature 74, and 76LM corresponding to sister macula feature 76. The landmarks are described as "corresponding" to a feature of the observation target to signify that the landmark and its sister feature are immediately opposite each other on the shell outer surface and shell inner surface respectively.

Each landmark may be a realistic portrayal of the corresponding target or may be a less realistic, schematic indication or portrayal of the target. In practice the location of a landmark (immediately opposite its sister feature on the outer surface of back panel 34) is of more importance than its artistic portrayal, provided it is clear which landmark corresponds to which anatomical feature.

Referring to FIGS. 7-10, light emanating from an ophthalmoscope is a beam of approximately circular cross section which makes a spot 94 on the inner surface of back panel 34. At least the instructor region 90 of the shell is not completely impervious to the ophthalmoscope light. In other words some light passes through the shell, and is referred to herein as pass through light. As a result the instructor can observe the outer surface of instructor region 90 and discern the location at which the light is illuminating the inner surface. In practice, the student aims his ophthalmoscope through pupil 68 in an effort to locate and correctly identify an anatomical feature. By observing whether or not the pass-through light appears at the same location as a landmark the instructor can determine, among other things, whether or not the student has succeeded in locating the sister anatomical feature.

If the spot arising from the pass-through light has a noncircular profile (e.g. the light is truncated) the instructor will realize that the ophthalmoscope light is offset radially from the pupil and therefore the student's aim is being clipped by the pupil on one side or the other. If the profile is circular the instructor can use the diameter of the circle (too large or too small) to assess whether the student is holding the ophthalmoscope at the correct working distance (too near to the model eye or too far from it).

Figure 7:
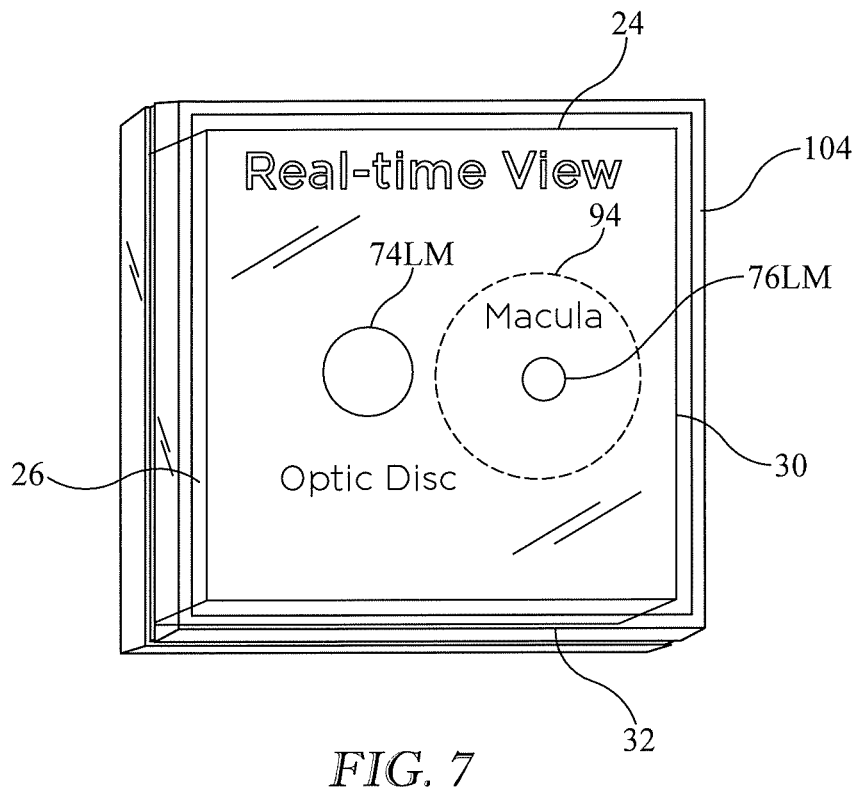
FIGS. 7-10 are views of the shell encased in a transparent capsule, the views showing the back panel of the shell as seen by an instructor when a student is practicing his ophthalmology skills.

FIG. 7 shows an example from the instructor's point of view. Ophthalmoscope spot 94 is approximately circular and is nearly centered on macula landmark 76LM. The circular geometry of the spot demonstrates that the ophthalmoscope beam is well aligned with (not offset from) the center of pupil 68, and therefore the student's aim is satisfactory. The fact that the spot is nearly centered on the macula landmark informs the instructor that the student is viewing the macula feature 76 on the inner surface of the cube.

Figure 8:
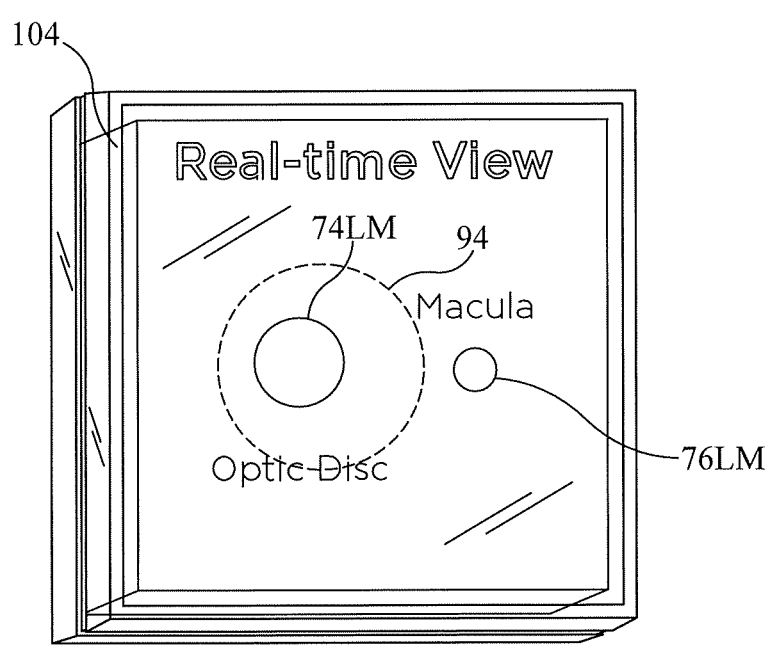

FIG. 8 shows a similar example in which the ophthalmoscope spot 94 is approximately circular and reasonably well centered on the optic disc landmark 74LM. As a result the instructor has confidence that the student's aim is satisfactory and that the student is viewing the optic disc feature 74.

Figure 9:
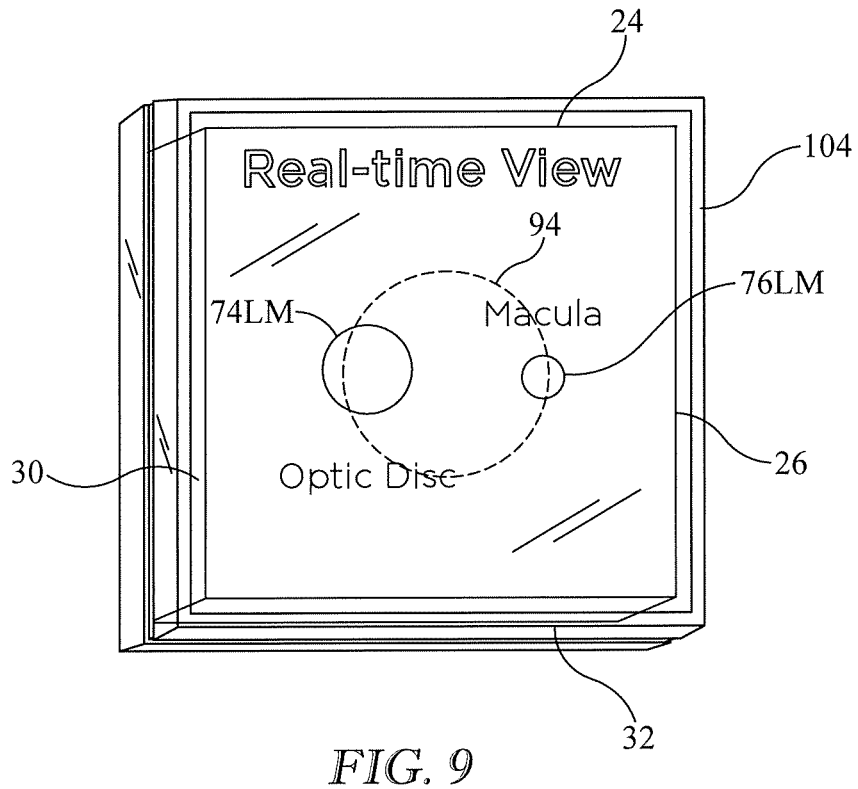

FIG. 9 shows another example from the instructor's perspective. Ophthalmoscope spot 94 is not well positioned with respect to either the optic disk landmark 74LM or the macula landmark 76LM. If the student reports that he is viewing one of those features, the instructor will recognize the error and can provide meaningful feedback and coaching to the student.

Figure 10:
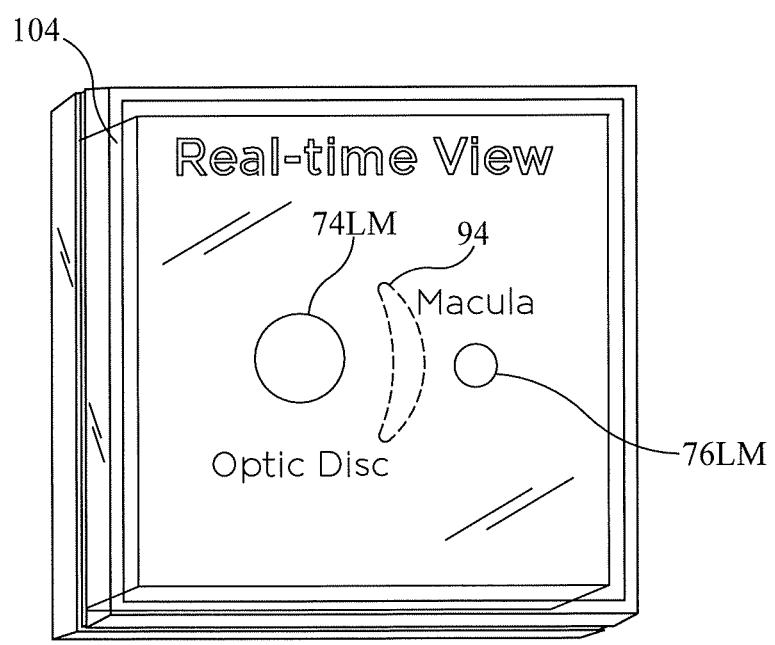

FIG. 10 shows an example in which the ophthalmoscope spot 94 is truncated and therefore is crescent shaped rather than circular. The instructor is therefore informed that the ophthalmoscope beam is radially off-center relative to the pupil. Once again the instructor will recognize the error in the student's technique and can provide meaningful feedback and coaching.

In view of the foregoing, certain other features of and enhancements to the ophthalmologic teaching aid can now be better appreciated.

The teaching aid is reversible so that it simulates the left eye as well as the right eye. The teaching aid shown in FIG. 11 includes renderings of two discernibly different anatomical features, namely optic disc feature 74 and macula feature 76. The letter "R" appearing in its right side up orientation signifies that the teaching aide is oriented to simulate the right eye. Accordingly, macula feature 76 is more toward the left side of the illustration, i.e. in a more temporal location in relation to the optic disk feature 74.

Figure 11:
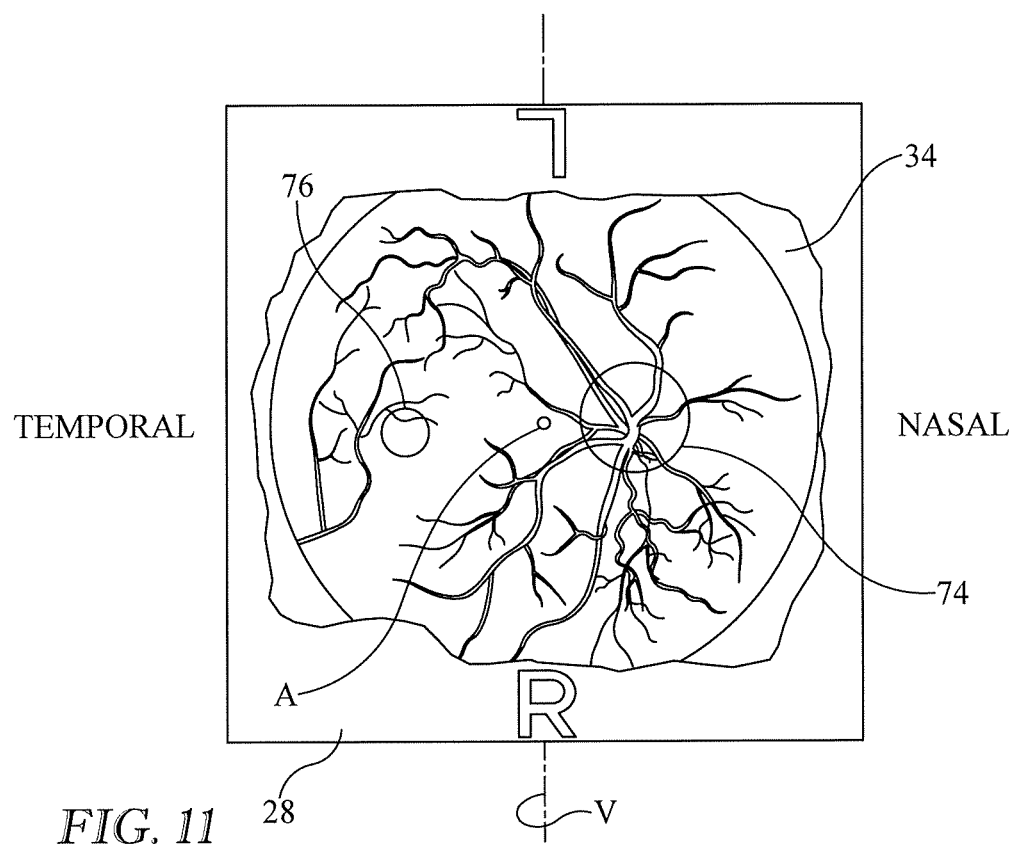
FIG. 11 is a front elevation view of the teaching aid with most of its front panel broken away to reveal features of interest of a right eye depicted on the inner surface of the back panel, the features of interest being offset from each other so that one feature is more nasally located and the other feature is more temporally located.
Figure 12:
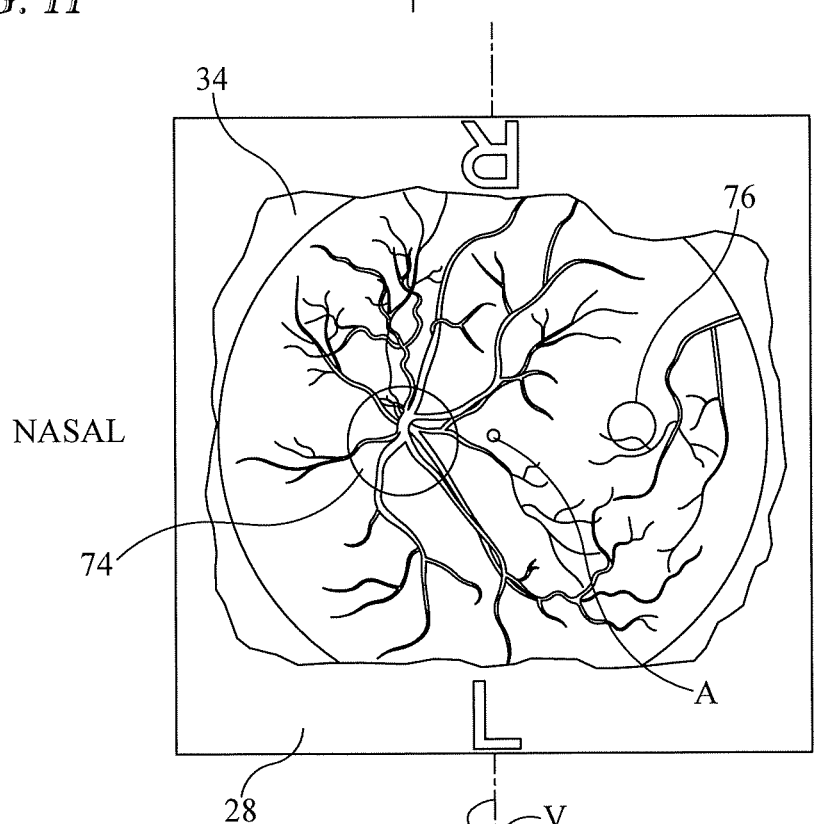
FIG. 12 is a view similar to FIG. 11 but rotated 180 degrees about an axis A to represent a left eye, and showing that the features of interest of the rotated device remain in the nasal/temporal offset relationship of FIG. 11.

If the student or instructor rotates the shell 180 degrees about longitudinal axis A from the orientation of FIG. 11 to the orientation of FIG. 12, the letter "L" appears in its right side up orientation to signify that the teaching aid now represents the left eye. Optic disc feature 74 is toward the left side of the illustration, and macula feature 76 is toward the right of the illustration. However the anatomical relationship of FIG. 11 is preserved. In other words irrespective of whether the teaching aid is in the first orientation of FIG. 11 representing the right eye or in the second orientation of FIG. 12 representing the left eye, the macula feature is in a more temporal location in relation to the optic disc feature, and the optic disc feature is in a more nasal location in relation to the macula feature.

Figure 13:
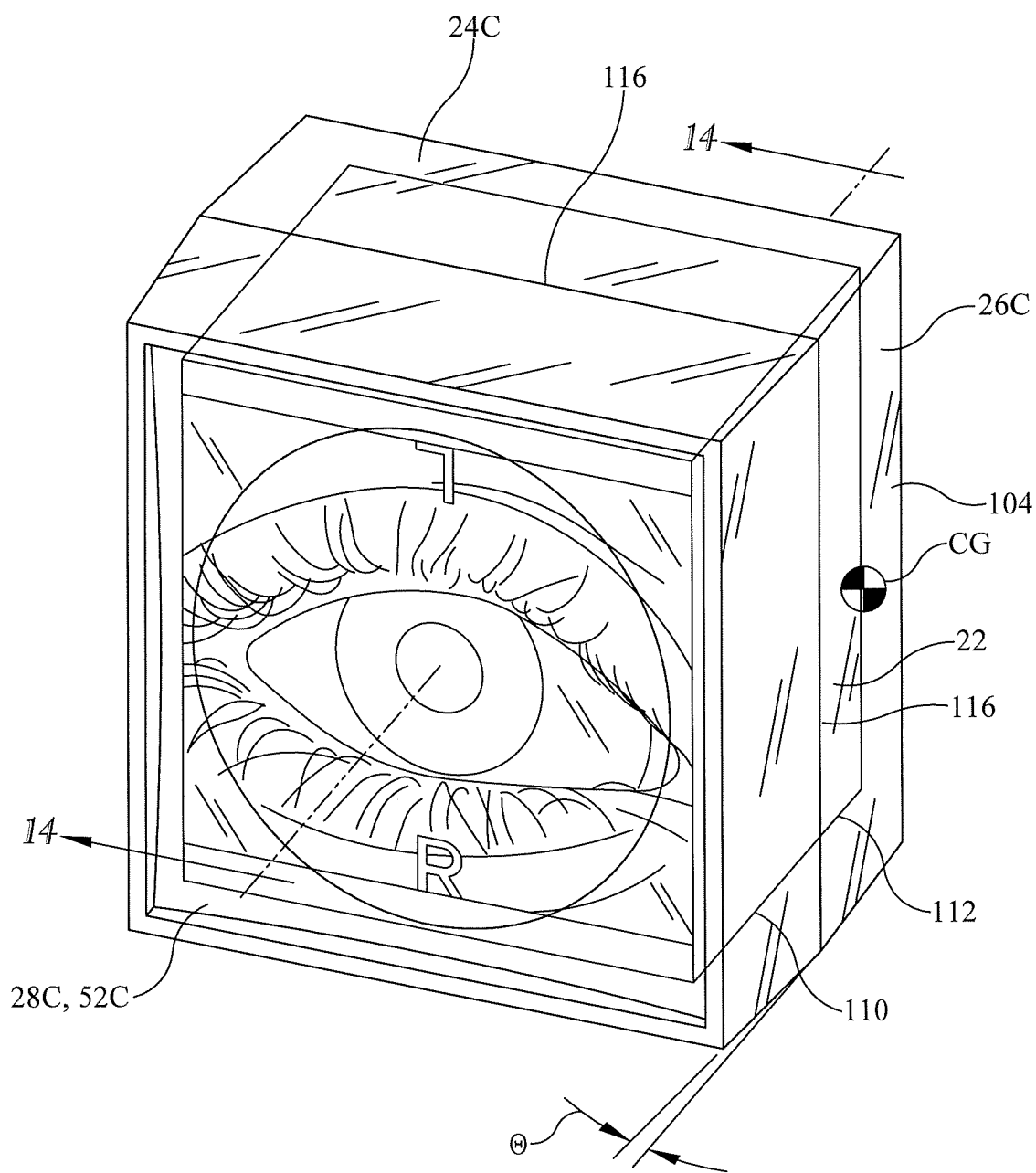
FIG. 13 is a view showing the shell encased in a transparent capsule.

The ophthalmological teaching aid may take the form of the shell already described. Alternatively, as seen in FIGS. 13-14, the teaching aid may comprise shell 22 and a transparent capsule 104 which encases the shell and is more durable than the shell. (The shell is also visible in FIGS. 7-10.) The capsule imparts a certain amount of heft to the teaching aid so that it is not easily moved about by, for example, vibrations or air movement. The capsule also shields the relatively delicate shell from damage.

The illustrated capsule has a forward segment 110 and a rearward segment 112. The forward and rearward segments of the top, bottom and sides 24C, 32C, 26C, 30C, are inclined relative to each other at angle θ so that they meet at a ridge 116. The center of gravity CG of the teaching aid is rearward of the ridge. As a result, when the teaching aid is placed on a flat host surface with any of sides 24C, 26C, 30C, 32C "down", only the rearward segment 112 of the "down" side of the capsule is in contact with the surface, and the forward segment 110 of the "down" side is nonparallel to the surface.

The front side 28C of the capsule includes a capsule student region 52C which overlies the shell student region 52 and includes a lens 118. The lens simulates the lens of a person's eye.

FIG. 15 shows an embodiment in which the at least some of the printed text and the landmarks 74LM and 76LM are depicted on the capsule rather than on the shell, for example on the outer surface of the shell. Alternatively the text may be printed on the shell and the landmarks depicted on the capsule or the text may be depicted on the capsule and the landmarks printed on the shell.

FIG. 16 shows an embodiment comparable to the teaching aid and variants thereof already described, but having a spherical shell 22 rather than a cubic shell.

Figure 17:
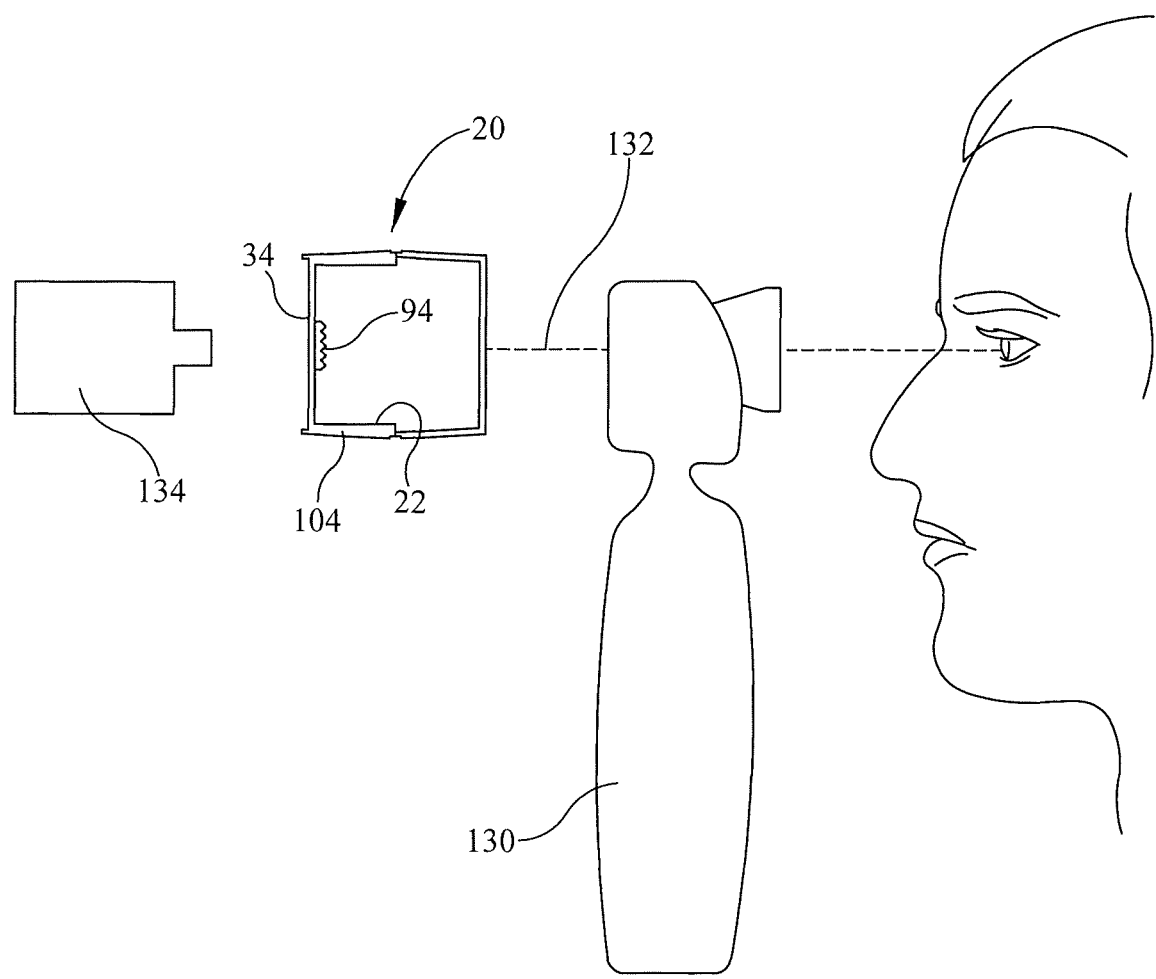
FIG. 17 is a view demonstrating how the teaching aid can be used without an instructor being present.

FIG. 17 demonstrates how the teaching aid may be used without an instructor being present. The illustration shows a student looking at teaching aid 20 through an ophthalmoscope 130. As already described the light beam 132 emitted by the ophthalmoscope causes a spot 94 to appear on back panel 34. The spot is visible on the outer surface of back panel 34. The spot is illustrated schematically as a slightly raised sawtooth feature. A camera 134 records the student's practice session. The student can later play the video recording to review and self-critique his technique. In one embodiment, software is used to mirror image the video recording left to right. Mirror imaging may be beneficial because the non-mirror-imaged recording is laterally reversed in comparison to the view that the student sees from his perspective. The mirror imaging can help address any confusion the student may experience if he were to study the non-mirror-imaged recording. Software may also be used to analyze the recording in real time or near real time and, upon recognizing a particular type of student error, issue an aural indication of the error being made and/or the corrective action that the student should take. Examples of the aural indication include an audio recording of an actual human voice, or a synthesized audible statement of the error or corrective action. Example corrective actions include "move closer", "pan scope to the right more", and "make scope more horizontal".

Figure 18:
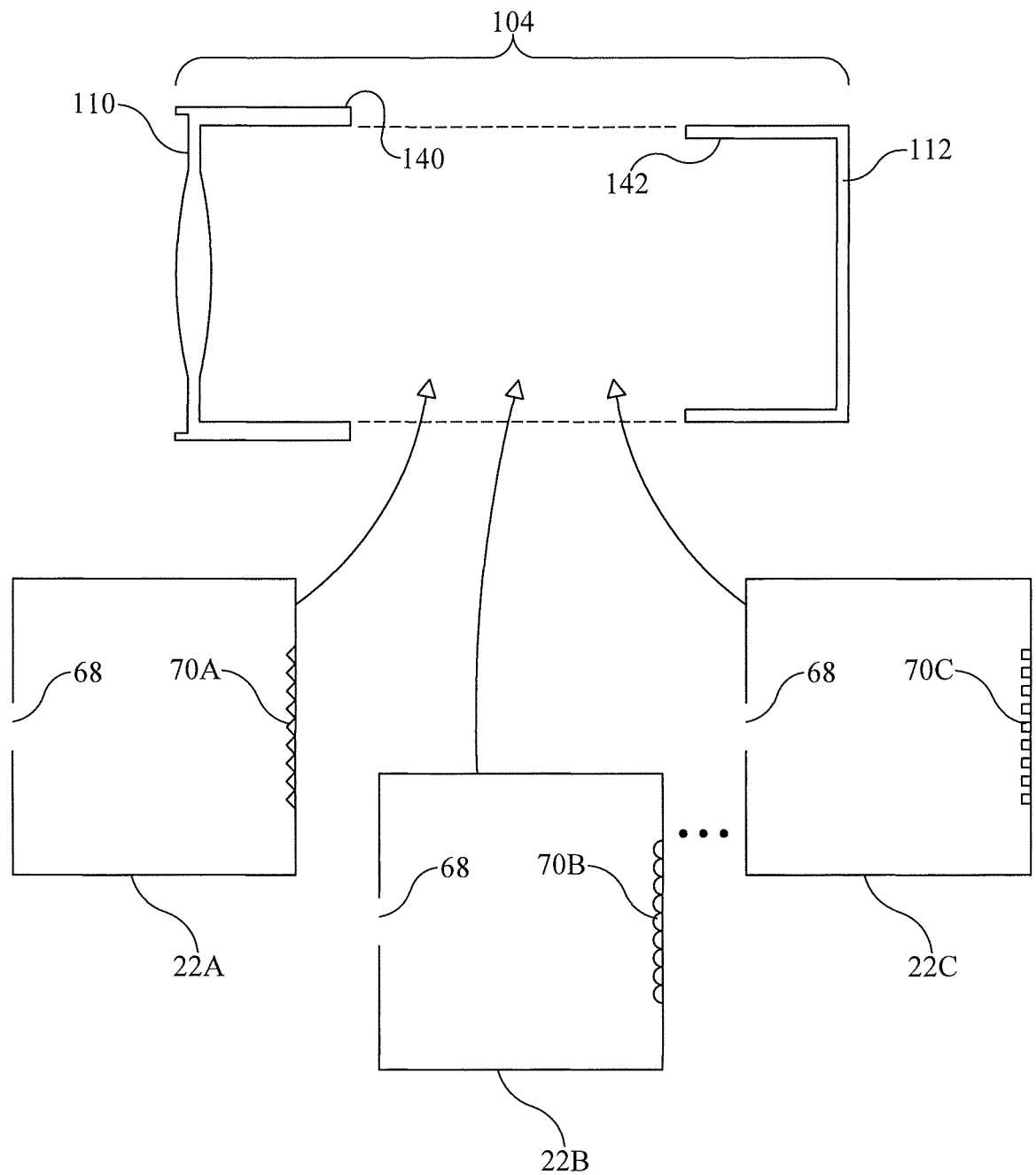
FIG. 18 is a schematic side elevation view showing an ophthalmological teaching aid comprised of a capsule and a suite of shells which can be individually placed into and removed from the inside of the capsule.

FIG. 18 shows an embodiment of the teaching aid which includes a capsule 104 having forward and rearward segments 110, 112. The segments are manually separable from each other, as illustrated. The capsule segments may also be rejoined with each other. When joined together surface 140 of segment 110 and surface 142 of segment 112 are essentially line-on-line with each other so that the segments fit together snugly, but can be separated and rejoined with only modest manual force.

The embodiment of FIG. 18 also includes a suite of two or more shells 22A, 22B, 22C. Each shell includes an observation target 70A, 70B, 70C indicated schematically in the illustration by a slightly raised feature. The illustrated observation targets are printed on the shell inner surface 44, specifically on the inner surface of back panel 34. Each observation target differs from the others in order to depict possible conditions of the eye. For example different targets may depict different diseases or may depict different stages of a disease. A target may also depict a substantially normal eye. The shells can be substituted for each other to give the student practice at recognizing different diseases and disease stages in comparison to a healthy eye.

Figure 19:
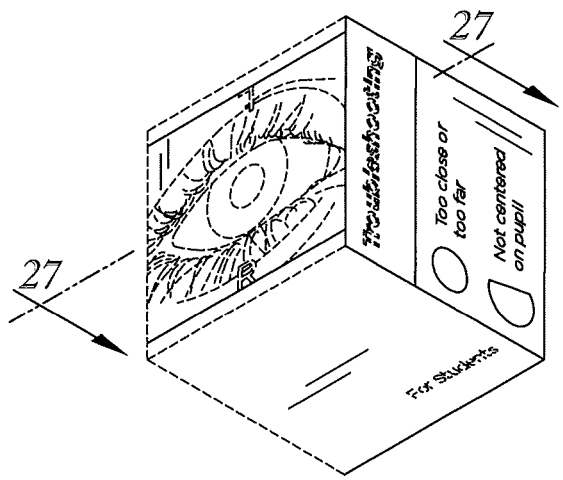
FIGS. 19-117 are additional illustrations of the design of the ophthalmalogical teaching aid.

FIG. 19 is a perspective view of a first embodiment of the design of an ophthalmological teaching aid showing a front panel, a bottom panel and a first lateral side panel thereof.

Figure 20:
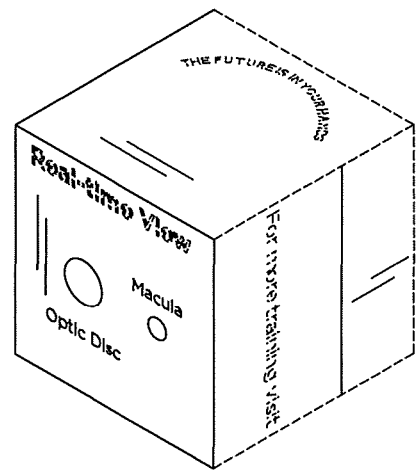

FIG. 20 is a perspective view of the first embodiment of the design of the teaching aid showing a back panel, a top panel, and a second lateral side panel thereof.

Figure 21:
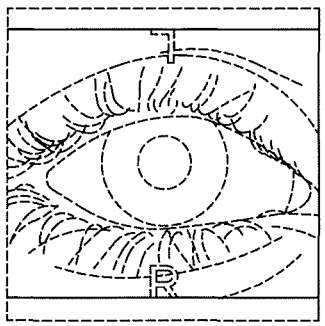

FIG. 21 is an elevation view of the exterior of the front panel of the design of the ophthalmological teaching aid.

Figure 22:
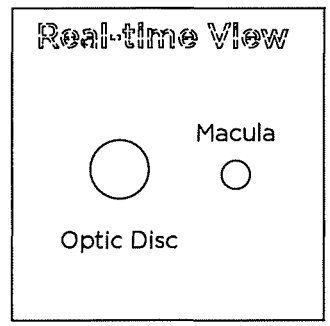

FIG. 22 is an elevation view of the exterior of the back panel of the design of the ophthalmological teaching aid.

Figure 23:
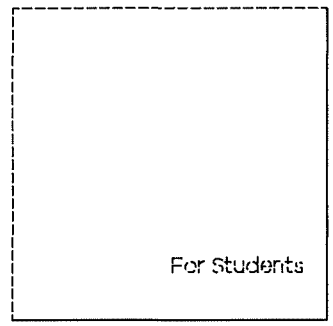

FIG. 23 is a plan view of the exterior of the bottom panel of the design of the ophthalmological teaching aid.

Figure 24:
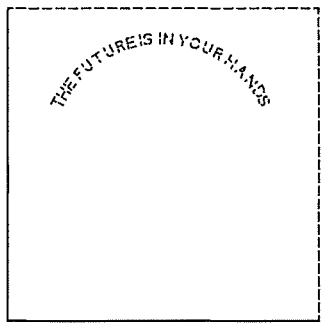

FIG. 24 is a plan view of the exterior of the top panel of the design of the ophthalmological teaching aid.

Figure 25:
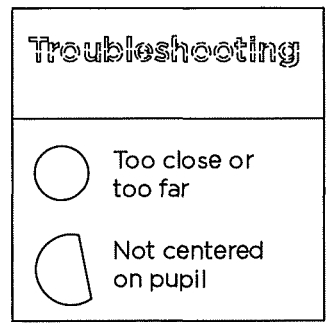

FIG. 25 is an elevation view of the exterior of the first lateral side panel of the design of the ophthalmological teaching aid.

Figure 26:
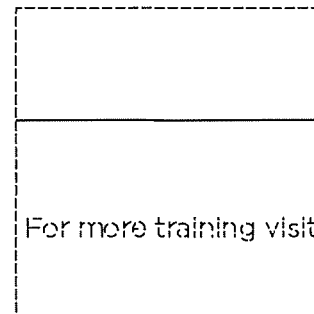

FIG. 26 is an elevation view of the exterior of the second lateral side panel of the design of the ophthalmological teaching aid.

Figure 27:
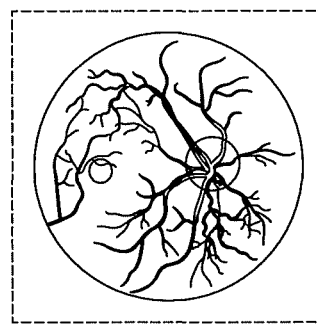
Figure 28:
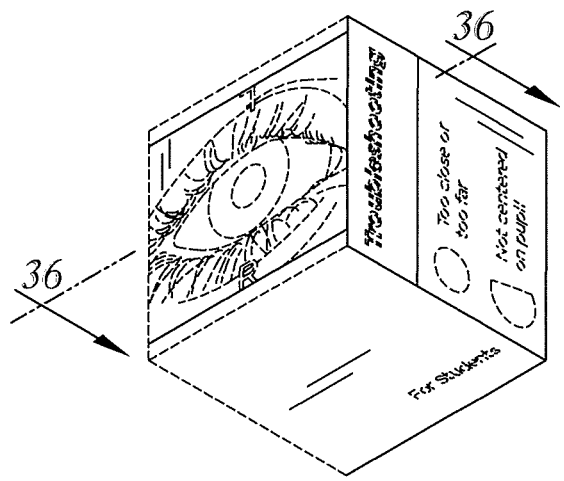
Figure 29:
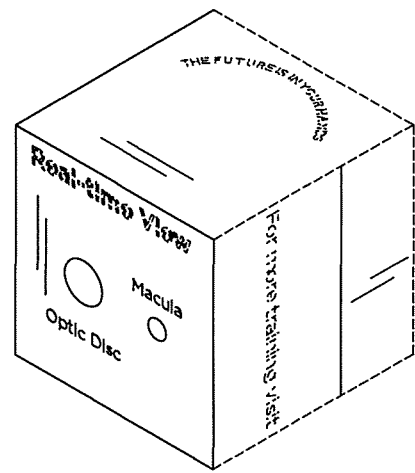
Figure 30:
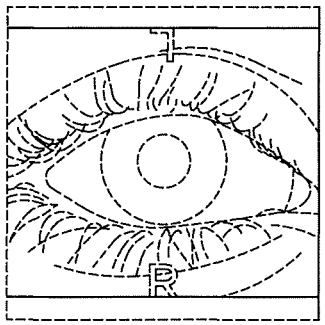
Figure 31:
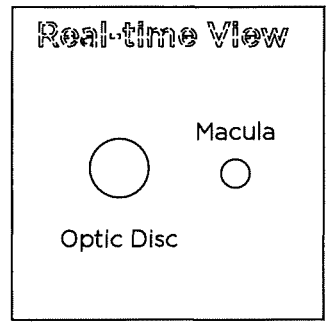
Figure 32:
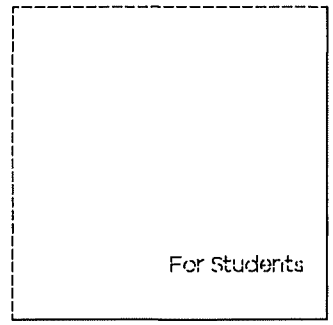
Figure 33:
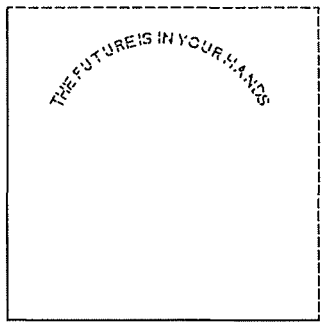
Figure 34:
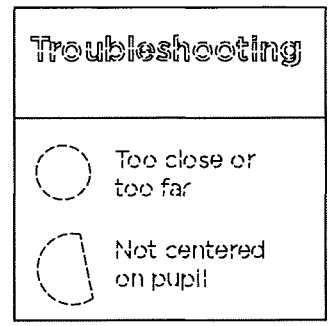
Figure 35:
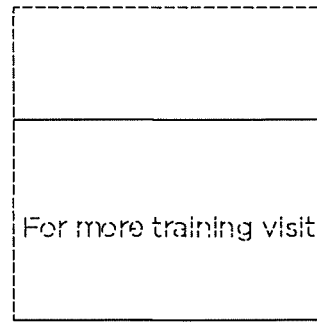
Figure 36:
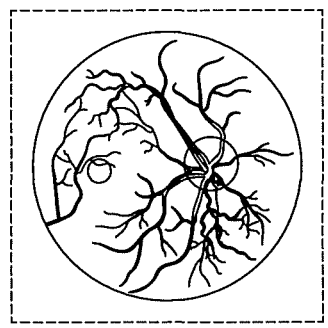
Figure 37:
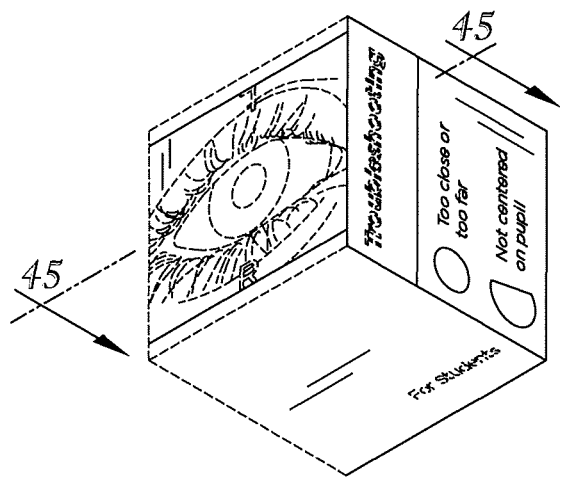
Figure 38:
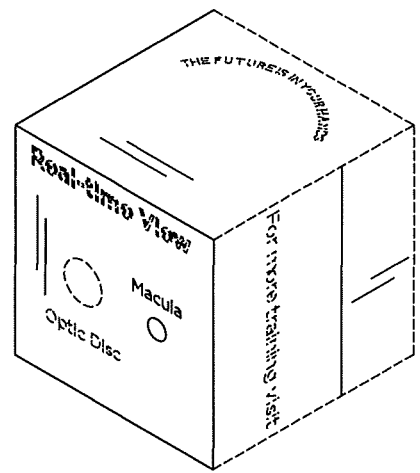
Figure 39:
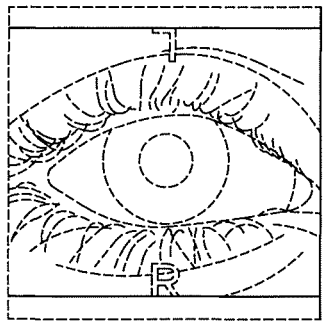
Figure 40:
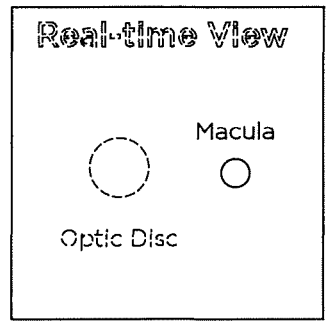
Figure 41:
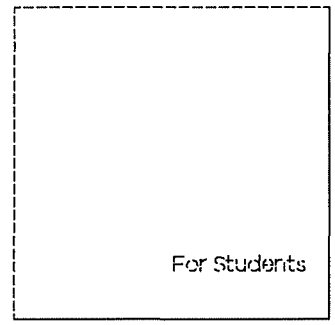
Figure 42:
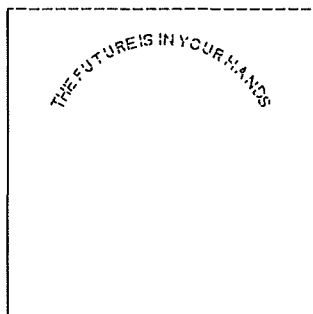
Figure 43:
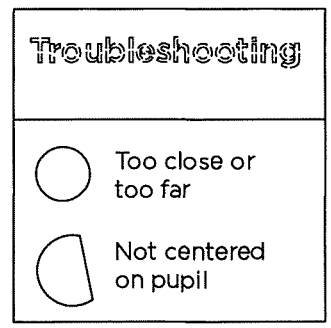
Figure 44:
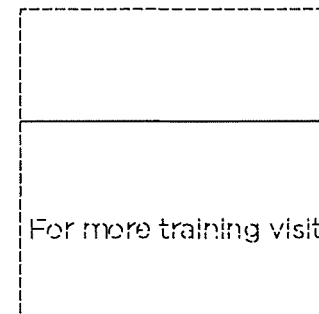
Figure 45:
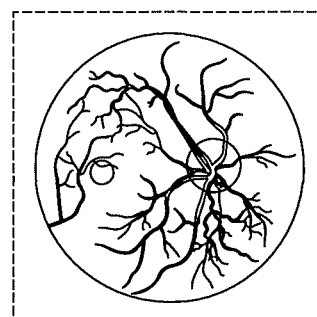
Figure 46:
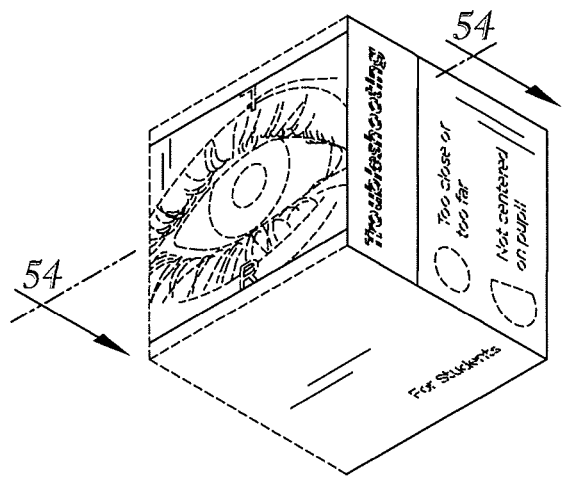
Figure 47:
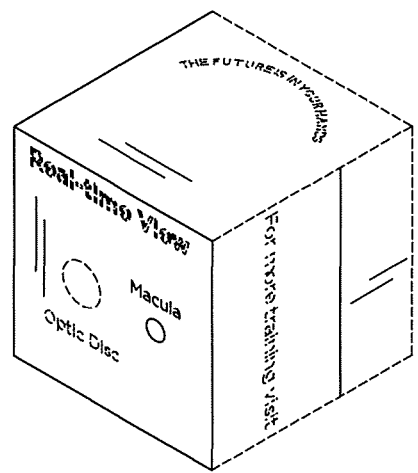
Figure 48:
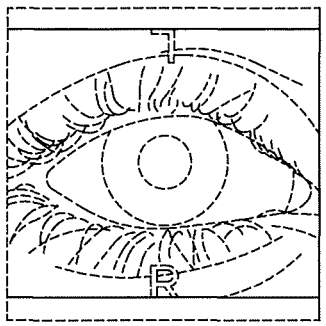
Figure 49:
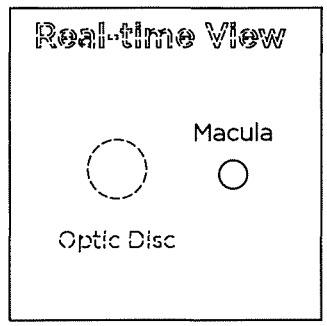
Figure 50:
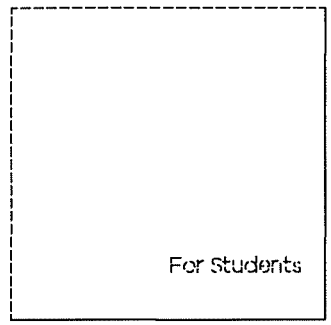
Figure 51:
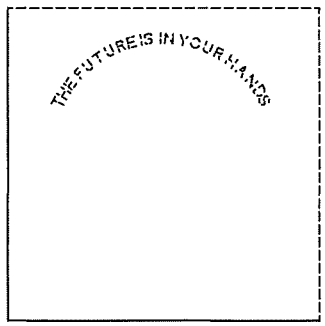
Figure 52:
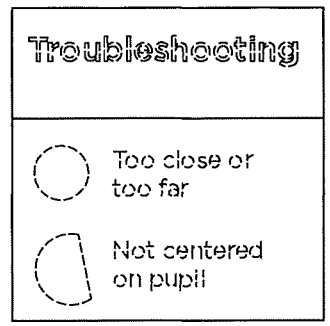
Figure 53:
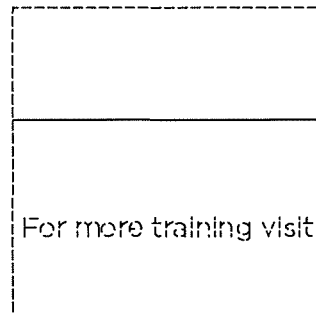
Figure 54:
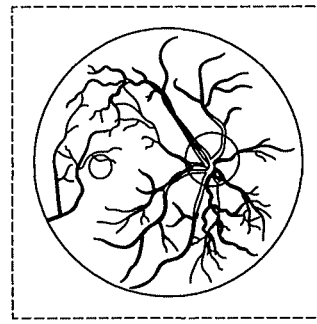
Figure 55:
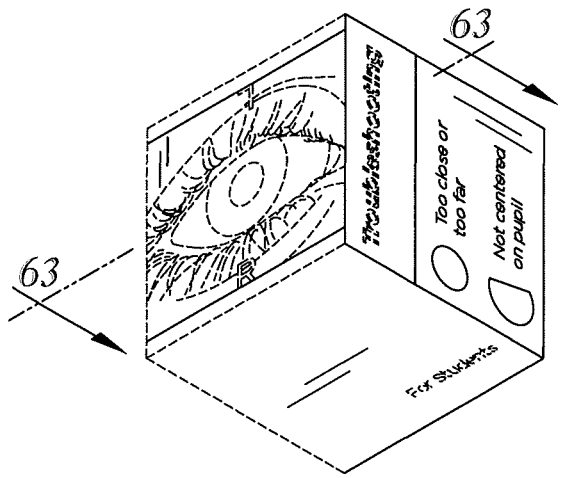
Figure 56:
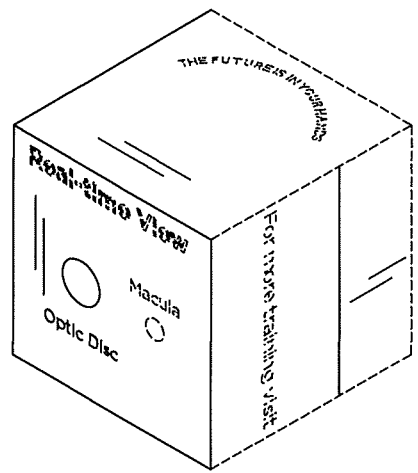
Figure 57:
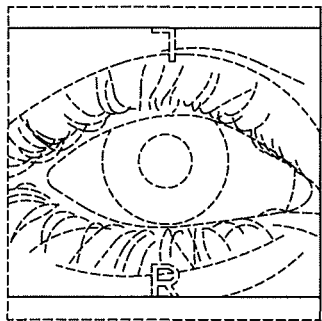
Figure 58:
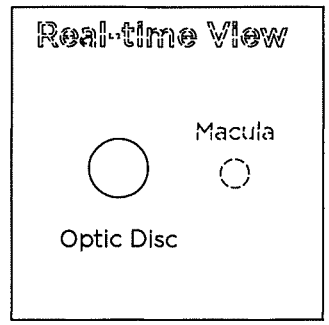
Figure 59:
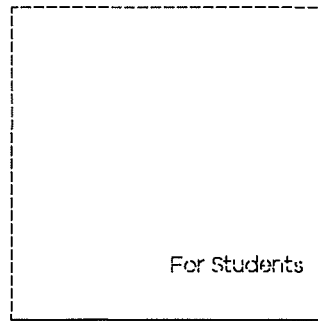
Figure 60:
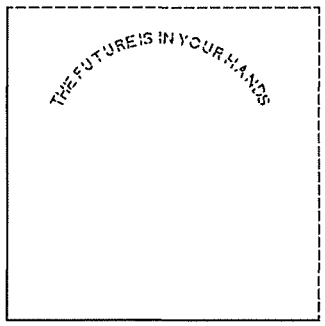
Figure 61:
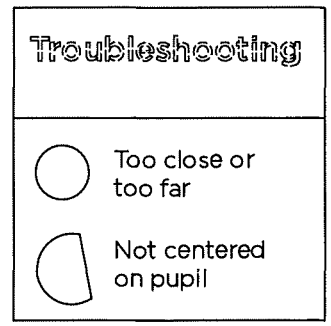
Figure 62:
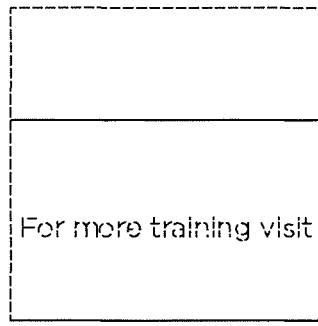
Figure 63:
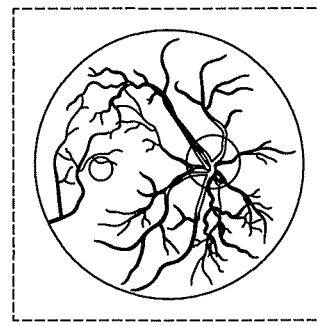
Figure 64:
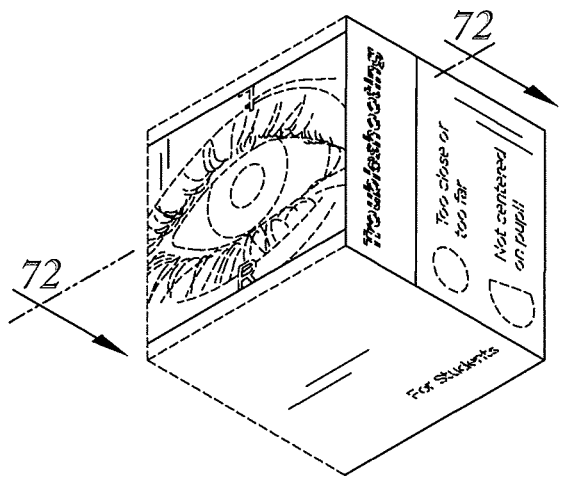
Figure 65:
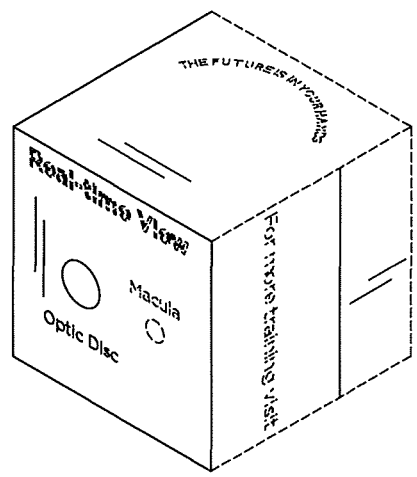
Figure 66:
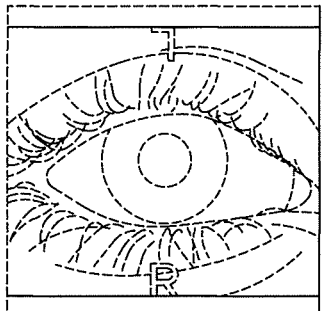
Figure 67:
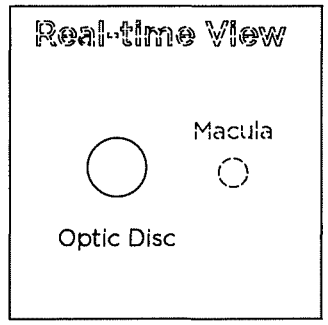
Figure 68:
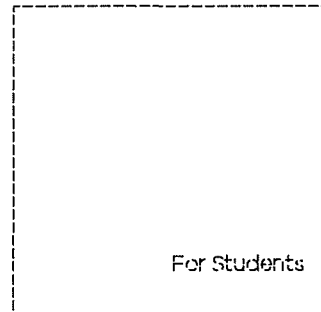
Figure 69:
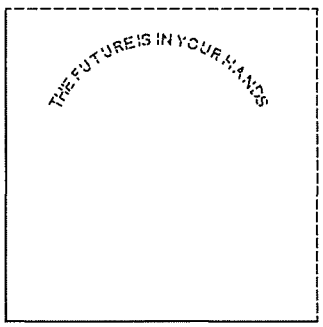
Figure 70:
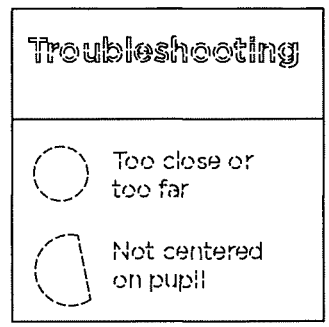
Figure 71:
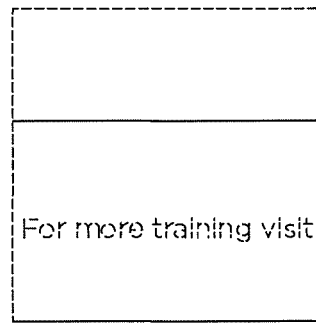
Figure 72:
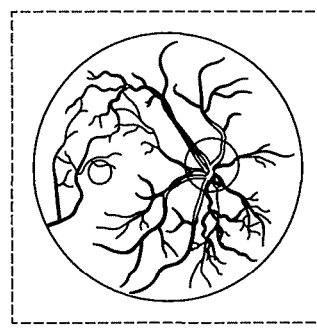
Figure 73:
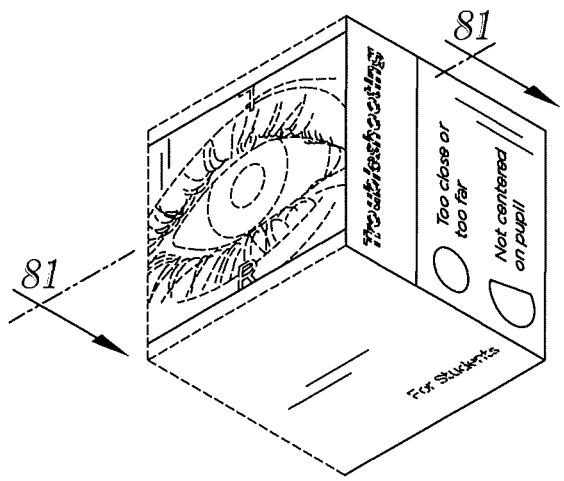
Figure 74:
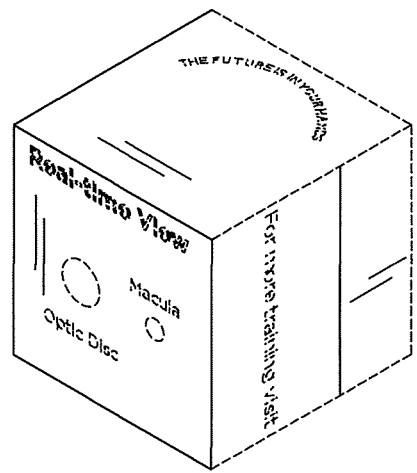
Figure 75:
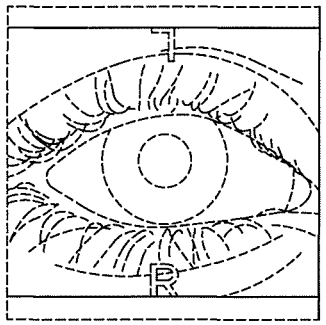
Figure 76:
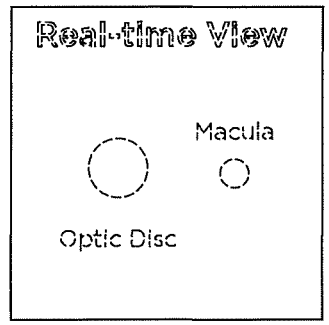
Figure 77:
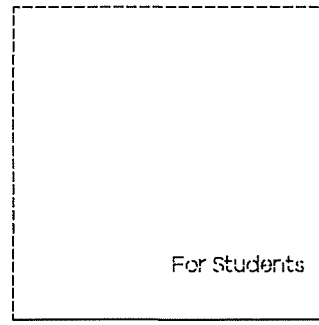
Figure 78:
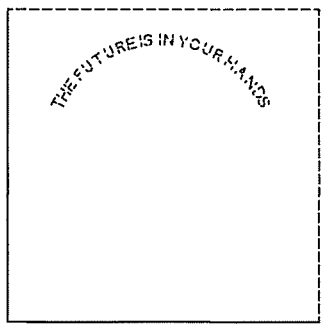
Figure 79:
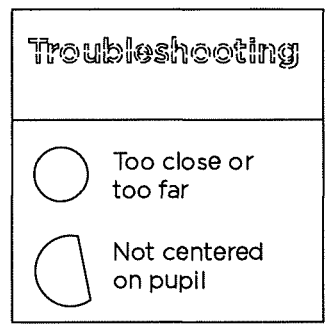
Figure 80:
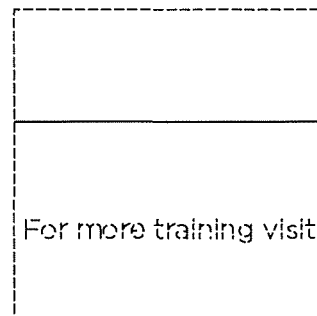
Figure 81:
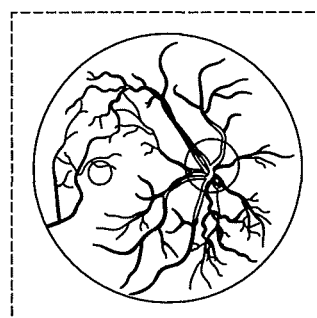
Figure 91:
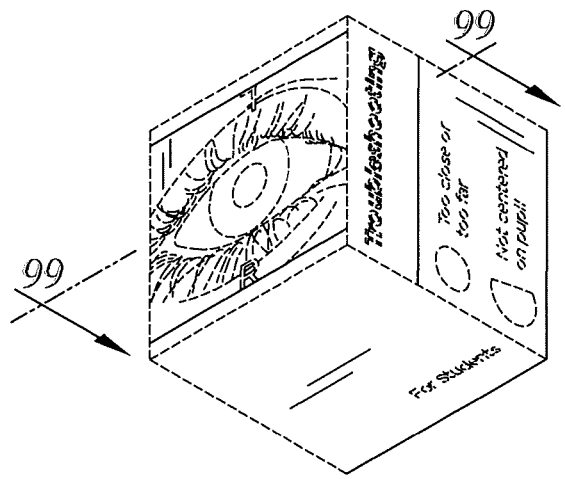
Figure 92:
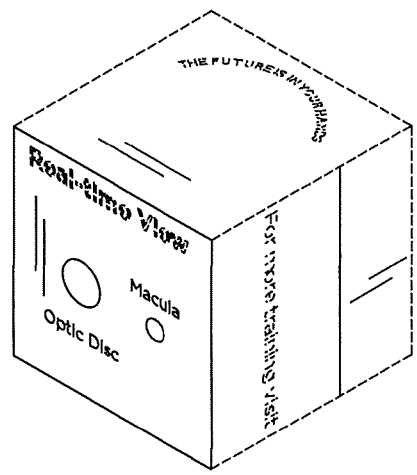
Figure 93:
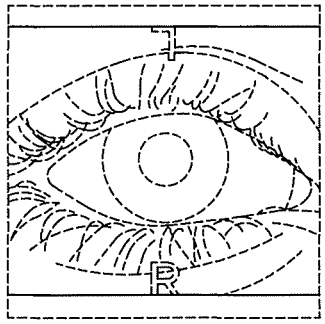
Figure 94:
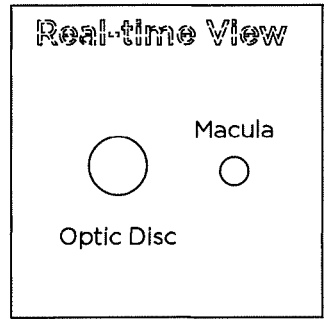
Figure 95:
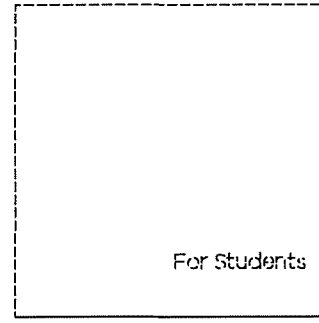
Figure 96:
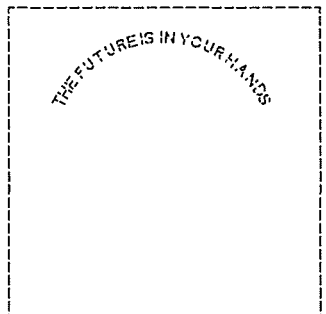
Figure 97:
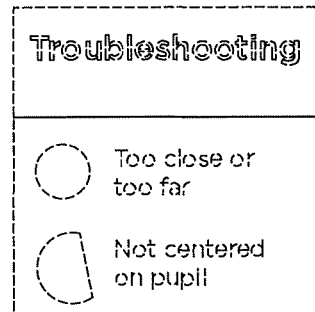
Figure 98:
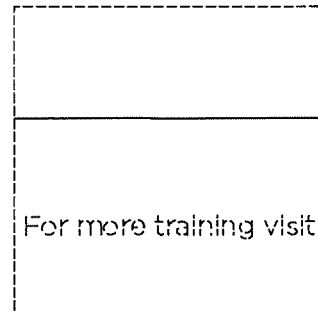
Figure 99:
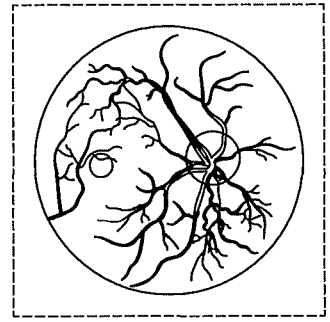
Figure 100:
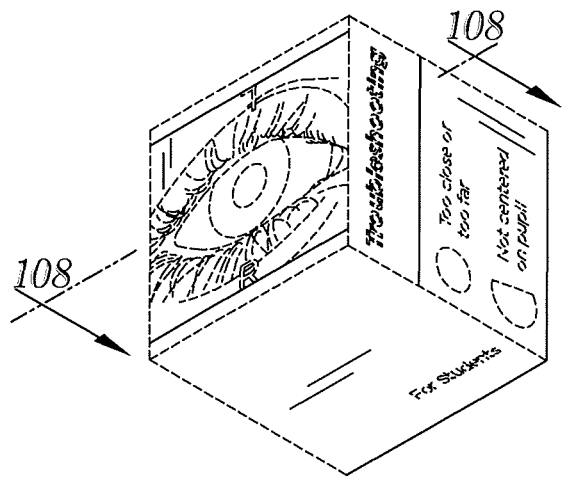
Figure 101:
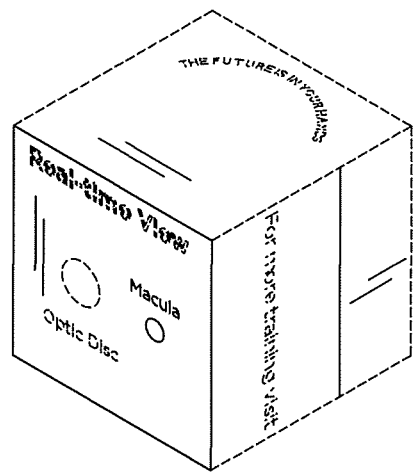
Figure 102:
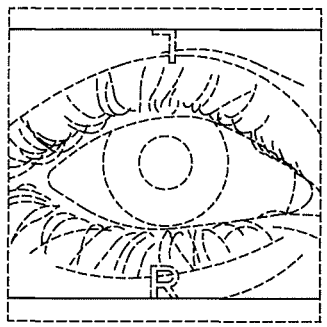
Figure 103:
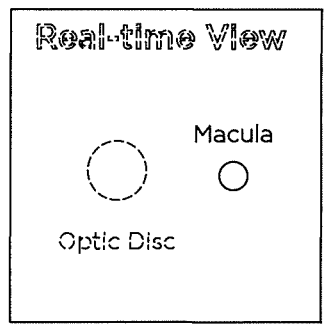
Figure 104:
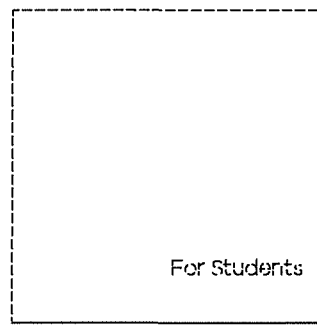
Figure 105:
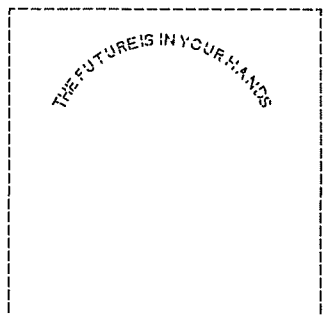
Figure 106:
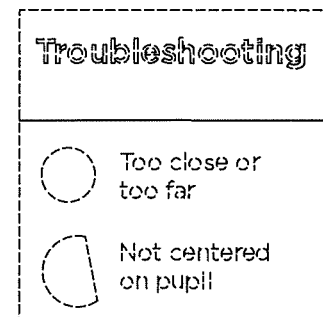
Figure 107:
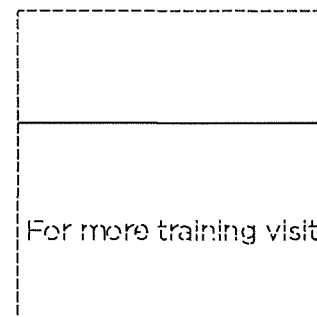
Figure 108:
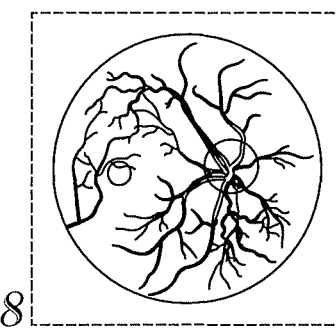
Figure 109:
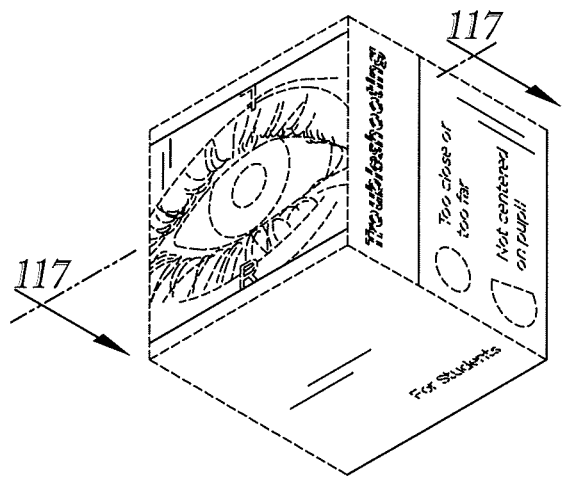
Figure 110:
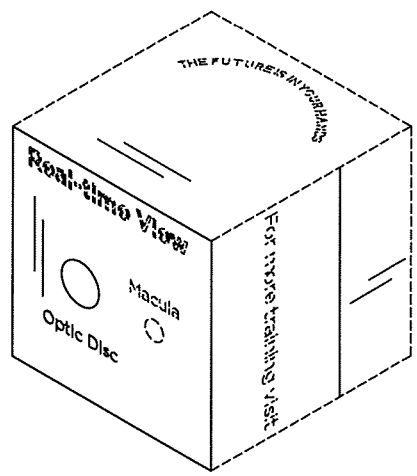
Figure 111:
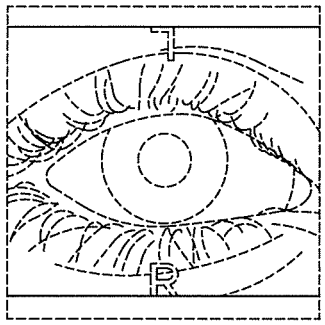
Figure 112:
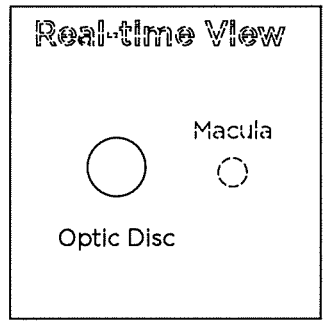
Figure 113:
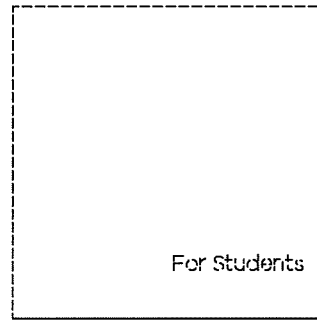
Figure 114:
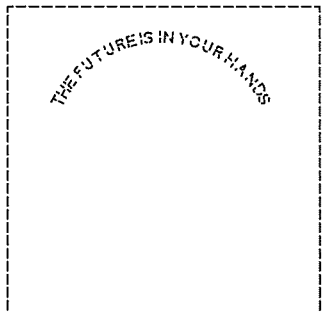
Figure 115:
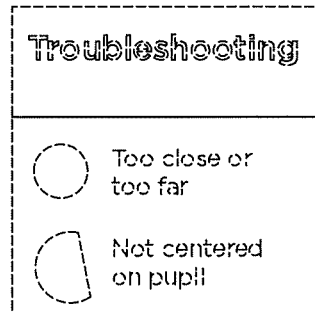
Figure 116:
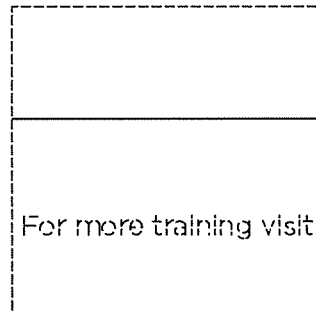
Figure 117:
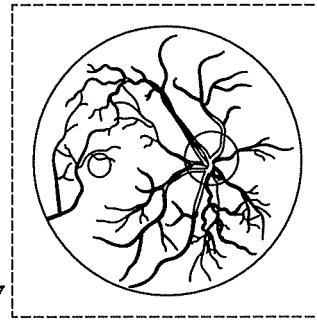

FIG. 27 is an elevation view of the interior of the back panel of the design of the ophthalmological teaching aid taken in the direction 27-27 of FIG. 19.

FIGS. 28-36 are views analogous to those of FIGS. 19-27 showing a second embodiment of the design of the teaching aid.

FIGS. 37-45 are views analogous to those of FIGS. 19-27 showing a third embodiment of the design of the teaching aid.

FIGS. 46-54 are views analogous to those of FIGS. 19-27 showing a fourth embodiment of the design of the teaching aid.

FIGS. 55-63 are views analogous to those of FIGS. 19-27 showing a fifth embodiment of the design of the teaching aid.

FIGS. 64-72 are views analogous to those of FIGS. 19-27 showing a sixth embodiment of the design of the teaching aid.

FIGS. 73-81 are views analogous to those of FIGS. 19-27 showing a seventh embodiment of the design of the teaching aid.

FIGS. 82-90 are views analogous to those of FIGS. 19-27 showing an eighth embodiment of the design of the teaching aid.

FIGS. 91-99 are views analogous to those of FIGS. 19-27 showing an eighth embodiment of the design of the teaching aid.

FIGS. 100-108 are views analogous to those of FIGS. 19-27 showing an eighth embodiment of the design of the teaching aid.

FIGS. 109-117 are views analogous to those of FIGS. 19-27 showing an eighth embodiment of the design of the teaching aid.

Although this disclosure refers to specific embodiments, it will be understood by those skilled in the art that various changes in form and detail may be made without departing from the subject matter set forth in the accompanying claims.

We claim:

1. An ophthalmological teaching aid comprising:
    a shell having:
        a plurality of sides defining an interior, each of the plurality of sides having an outer surface and an inner surface,
        a student region with a viewing window disposed on one side of the shell,
        an observation target disposed on the inner surface of a side of the shell opposite the side having the student region and in the interior, the observation target positioned to be visible to a viewer looking through the viewing window and having at least one feature residing at a feature location, and
        an instructor region spatially corresponding to at least a portion of the observation target, the instructor region being exterior of the side of the shell having the observation target and having one or more landmarks corresponding to the feature location wherein the shell is made from a translucent material, the teaching aid being configured to enable an instructor to visually detect a pass thru light spot of an ophthalmoscope directed at the observation target by a student through the viewing window at the instructor region.

2. The teaching aid of claim 1 wherein the one or more landmarks are on the outer surface of the shell.

3. The teaching aid of claim 1 wherein the one or more landmarks are a schematic portrayal of the at least one feature of the observation target.

4. The teaching aid of claim 1 wherein the observation target is printed on the inner surface.

5. The teaching aid of claim 1 wherein the student region includes a depiction of a customarily visible part of the eye, and the student viewing window is the pupil of the eye aligned with the observation target.

6. The teaching aid of claim 5 wherein the observation target includes two features wherein one of the features represents a macula and the other feature represents an optic disc, and wherein irrespective of whether the teaching aid is in a first orientation representing the right eye or in a second orientation representing the left eye the macula feature is in a more temporal location in relation to the optic disc, the second orientation being 180 degrees of rotation about a longitudinal axis relative to the first orientation.

7. The teaching aid of claim 1 in which the observation target includes at least two discernibly different features on opposite sides of a sagittal plane.

8. The teaching aid of claim 1 wherein the viewing window is an aperture.

9. The teaching aid of claim 1 wherein the outer surface includes informational text on at least one side of the shell.

10. The teaching aid of claim 9 wherein the informational text depicts at least one representation acting as a guide for helping an instructor to recognize common student errors.

11. The teaching aid of claim 10, wherein the guide is a representation of at least one of:
    a) the appearance of the pass through light spot if a student is holding the ophthalmoscope too near or too far away from the shell; and
    b) the appearance of the pass through light spot if the student is not centered on the pupil.

12. The teaching aid of claim 1 wherein the observation target is a rendering of anatomical features of an ocular fundus.

13. The teaching aid of claim 12 wherein not all of the anatomical features of the observation target are anatomically correctly positioned.

14. The teaching aid of claim 13, wherein at least some sides of the shell include information in the form of printed text.

15. The teaching aid of claim 1 including a transparent capsule which encases the shell.

16. The teaching aid of claim 15 wherein the capsule includes a capsule student region which overlies the shell student region and includes a lens.

17. The teaching aid of claim 15 wherein the one or more landmarks are on the capsule.

18. The teaching aid of claim 15 wherein the capsule has a capsule surface which includes information text.

19. An ophthalmological teaching aid comprising:
    a suite of at least two shells each shell of the suite having an outer surface, an interior, an inner surface, a student region with a viewing window, and an observation target positioned to be visible to a viewer looking through the window, the observation targets depicting different conditions of the eye;
    a transparent capsule comprised of segments which are manually separable from each other and manually joinable to each other so that members of the suite of shells can be substituted for each other when the segments are separated so that the substituted shell is encased in the capsule when the segments are rejoined to each other.

20. A method of using an ophthalmological teaching aid, the aid having:
    a shell having an outer surface, an interior, an inner surface, a student section with a viewing window, an observation target on the inner surface positioned to be visible to a viewer looking through the window, the observation target having at least one feature residing at a feature location, and an instructor region on the outer surface opposite at least a portion of the observation target, the portion of the shell corresponding to the observation target and the instructor region being non-permeable to light emitted by an ophthalmoscope so than an ophthalmoscope light spot is visible on the outer surface, the teaching aid also having a landmark corresponding to the feature location;
    the method including making a recording of a student practice session, the recording showing the spatial relationship between the light spot and the landmark.

* * * * *